(12) United States Patent
Fujimoto

(10) Patent No.: US 8,400,757 B2
(45) Date of Patent: Mar. 19, 2013

(54) ELECTROLYTIC CAPACITOR

(75) Inventor: Kazumasa Fujimoto, Saga (JP)

(73) Assignees: SANYO Electric Co., Ltd., Moriguchi-shi (JP); SAGA SANYO INDUSTRIES Co., Ltd., Kishima-gun (JP)

( * ) Notice: Subject to any disclaimer, the term of this patent is extended or adjusted under 35 U.S.C. 154(b) by 14 days.

(21) Appl. No.: 12/978,951

(22) Filed: Dec. 27, 2010

(65) Prior Publication Data

US 2011/0157778 A1 Jun. 30, 2011

(30) Foreign Application Priority Data

Dec. 29, 2009 (JP) ................................. 2009-299079

(51) Int. Cl.
*H01G 4/00* (2006.01)

(52) U.S. Cl. ........ 361/531; 361/502; 361/508; 361/511; 361/530; 361/505

(58) Field of Classification Search ................... 361/502, 361/508, 540, 517, 533, 511, 512, 530, 531, 361/505

See application file for complete search history.

(56) References Cited

U.S. PATENT DOCUMENTS 6,366,447 B1 * 4/2002 Nakaaki ........................ 361/518

FOREIGN PATENT DOCUMENTS

JP 2004-179621 A 6/2004

* cited by examiner

*Primary Examiner* — Nguyen T Ha
*Assistant Examiner* — Hung Dang
(74) *Attorney, Agent, or Firm* — Westerman, Hattori, Daniels & Adrian, LLP

(57) ABSTRACT

A one-side pressed terminal is applied as a first anode (cathode) lead tab terminal and the one-side pressed terminal is connected to an anode (a cathode) foil in such a manner that a position in a radial direction of a lead is shifted inward after winding. A one-side pressed terminal is applied as a second anode (cathode) lead tab terminal and the one-side pressed terminal is connected to the anode (cathode) foil in such a manner that a position in the radial direction of a lead is shifted inward after winding. Thus, while retaining characteristics as an electrolytic capacitor, connection of the anode (cathode) lead tab terminal to the anode (cathode) foil can be achieved in a stable manner.

4 Claims, 23 Drawing Sheets

FIG.13

| | CAPACITOR SIZE | | EXAMPLE | COMPARATIVE EXAMPLE |
|---|---|---|---|---|
| | φ mm | LEAD PITCH | ONE-SIDE PRESSING | BOTH-SIDE PRESSING |
| SAMPLE 1 | 5.0 | 2.0 | ○ | × |
| SAMPLE 2 | 6.3 | 2.5 | ○ | × |
| SAMPLE 3 | 8.0 | 3.5 | ○ | × |
| SAMPLE 4 | 10.0 | 5.0 | ○ | × |
| SAMPLE 5 | 12.5 | 5.0 | ○ | ○ |
| SAMPLE 6 | 16.0 | 7.5 | ○ | ○ |

DIAGRAM SHOWING ARRANGEMENT OF LEAD TAB TERMINALS

|  | CAPACITOR SIZE | EXAMPLE | | COMPARATIVE EXAMPLE | |
|---|---|---|---|---|---|
|  |  | ONE-SIDE PRESSING | | BOTH-SIDE PRESSING | |
|  | φ mm | ARRANGEMENT PATTERN A | ARRANGEMENT PATTERN B | ARRANGEMENT PATTERN A | ARRANGEMENT PATTERN B |
| SAMPLE 1 | 5.0 | × | ○ | × | × |
| SAMPLE 2 | 6.3 | × | ○ | × | × |
| SAMPLE 3 | 8.0 | × | ○ | × | ○ |
| SAMPLE 4 | 10.0 | ○ | ○ | × | ○ |
| SAMPLE 5 | 12.5 | ○ | ○ | × | ○ |
| SAMPLE 6 | 16.0 | ○ | ○ | ○ | ○ |

ELECTROLYTIC CAPACITOR

This nonprovisional application is based on Japanese Patent Application No. 2009-299079 filed with the Japan Patent Office on Dec. 29, 2009, the entire contents of which are hereby incorporated by reference.

BACKGROUND OF THE INVENTION

1. Field of the Invention

The present invention relates to an electrolytic capacitor, and particularly to an electrolytic capacitor formed by winding an anode foil, a cathode foil and the like.

2. Description of the Related Art

An electrolytic capacitor formed by winding up an anode foil and a cathode foil with separator paper being interposed represents one form of an electrolytic capacitor.

Here, a method of manufacturing an electrolytic capacitor having a two-terminal (one anode terminal and one cathode terminal) structure representing such a wound-type electrolytic capacitor will now be described. Initially, as shown in FIG. 25, band-shaped anode foil 103 and cathode foil 104 each having a prescribed length and two sheets of separator paper 105, 106 are prepared. For example, an aluminum foil having a dielectric oxide film formed is applied as an anode foil and an aluminum foil is applied as a cathode foil.

An anode lead tab terminal 110 is connected at a prescribed position in a longitudinal direction of anode foil 103, and a cathode lead tab terminal 113 is connected at a prescribed position in a longitudinal direction of cathode foil 104. As shown in FIGS. 26 and 27, a columnar boss portion 116a, a plate-shaped connection portion 116b connected to anode (cathode) foil 103, 104, and a columnar lead 116c serving as an anode (a cathode) terminal are provided in anode (cathode) lead tab terminal 110, 113.

As shown in FIG. 25, anode foil 103, cathode foil 104 and the like are arranged in such a manner that one sheet of separator paper 105 is sandwiched between anode foil 103 and cathode foil 104 and anode foil 103 is sandwiched between one sheet of separator paper 105 and the other sheet of separator paper 106. Then, as shown in FIG. 28, one-end sides of arranged anode foil 103, cathode foil 104 and sheets of separator paper 105, 106 are sandwiched between cores 131a and 131b. Then, by turning cores 131a, 131b clockwise in that state, anode foil 103, cathode foil 104 and the like are wound up from the one-end side, to thereby form a wound-type electrolytic capacitor.

An electrolytic capacitor has an inductance component referred to as equivalent series inductance (ESL). This ESL increases with the increase in a frequency, and then the electrolytic capacitor cannot function as a capacitor. Therefore, an electrolytic capacitor used in a high-frequency region is required to have lower ESL. In addition, an electrolytic capacitor has a resistance component referred to as equivalent series resistance (ESR), and it is required to have lower ESR.

In order to lower ESR and ESL, a multi-terminal electrolytic capacitor including a plurality of lead tab terminals as lead tab terminals is available. A method of manufacturing an electrolytic capacitor having a four-terminal (two anode terminals and two cathode terminals) structure representing such a multi-terminal electrolytic capacitor will now be described.

As shown in FIG. 29, a first anode lead tab terminal 111 and a second anode lead tab terminal 112 are connected at prescribed positions in a longitudinal direction of anode foil 103 respectively, and a first cathode lead tab terminal 114 and a second cathode lead tab terminal 115 are connected at prescribed positions in a longitudinal direction of cathode foil 104 respectively. Anode foil 103, cathode foil 104 and the like are arranged as in the case of a two-terminal electrolytic capacitor, and one-end sides thereof are sandwiched between cores 131a and 131b (see FIG. 28). By turning cores 131a, 131b clockwise in that state, anode foil 103, cathode foil 104 and the like are wound up from the one-end side, to thereby form a capacitor element 102 as shown in FIG. 30.

Then, a cut surface or the like of anode foil 103 and cathode foil 104 of capacitor element 102 is subjected to a prescribed treatment such as chemical conversion treatment. Then, a sealing rubber gasket 122 (see FIG. 31) is attached to capacitor element 102. Capacitor element 102 to which sealing rubber gasket 122 is attached is accommodated in an aluminum case 120 with a bottom (see FIG. 31) having a prescribed size. Then, an open-end side of aluminum case 120 is sealed by pressing in a lateral direction and curling and prescribed aging treatment is performed. Then, a seat plate 124 made of plastic is attached to a curled surface of aluminum case 120. Four openings 124a (see FIG. 31) corresponding to positions of respective lead tab terminals 111, 112, 114, 115 are formed in seat plate 124.

Thereafter, as shown in FIG. 31, each lead 116c protruding through opening 124a in seat plate 124 and serving as an electrode terminal is pressed and bent, to thereby complete an electrolytic capacitor 101 having a four-terminal structure. Patent Document 1 (Japanese Patent Laying-Open No. 2004-179621) represents one of documents disclosing an electrolytic capacitor having a multi-terminal structure including, for example, two to four terminals.

The inventors, however, have found that a conventional electrolytic capacitor having a multi-terminal structure suffers the following problems.

As described above, an electrolytic capacitor used in a high-frequency region in particular is required to have lower ESL. This ESL depends on a pitch between leads of anode (cathode) lead tab terminals, and the pitch is standardized in correspondence with a size of the electrolytic capacitor.

As electronic devices and the like are reduced in size in recent years, electrolytic capacitors are also required to have a smaller size. As shown in FIG. 32, as an electrolytic capacitor has a smaller diameter, a distance PL between two anode lead tab terminals 111 and 112 connected to the anode foil becomes smaller. As distance PL is smaller, plate-shaped connection portion 116b of anode lead tab terminal 111 (see FIGS. 26 and 27) and plate-shaped connection portion 116b of anode lead tab terminal 112 come too close to each other, and it becomes difficult to connect anode lead tab terminal 111 and anode lead tab terminal 112 to anode foil 103 in a stable manner, in view of a mechanism of a manufacturing apparatus. This is also applicable to two cathode lead tab terminals 114, 115.

On the other hand, if an attempt to ensure distance PL is made as shown in FIG. 33 such that plate-shaped connection portions 116b of anode (cathode) lead tab terminals 111, 112, 114, 115 do not come too close to one another, a pitch between the lead of the anode lead tab terminal and the lead of the cathode lead tab terminal that are opposed to each other is increased, which will be described further in detail. In a method of forming a capacitor element by winding up an anode foil, a cathode foil, and the like from a one-end side in a longitudinal direction, in the second lap of winding-up and later, the anode foil and the like are further wound up on a portion of the anode foil and the like that have been wound up so far, and a distance in a radial direction from a point of start of winding (center) becomes greater as winding proceeds.

Therefore, as shown in FIG. 34, a pitch PP between leads 116c of opposing first (second) anode (cathode) lead tab terminals increases. Variation in this pitch PP leads to higher ESL and characteristics as the electrolytic capacitor lower.

SUMMARY OF THE INVENTION

The present invention was made to solve the above-described problems, and an object of the present invention is to provide an electrolytic capacitor allowing stable connection of an anode (a cathode) lead tab terminal to an anode (a cathode) foil while retaining characteristics as an electrolytic capacitor.

An electrolytic capacitor according to the present invention has band-shaped anode foil and cathode foil and a plurality of lead tab terminals. The anode foil and the cathode foil are wound. The plurality of lead tab terminals each include a connection portion connected in contact with any of the anode foil and the cathode foil and a lead electrically connected to the connection portion and serving as a terminal. The plurality of lead tab terminals include two such anode lead tab terminals that the lead is arranged at a position shifted in a radial direction with respect to the connection portion, in a state that the anode foil and the cathode foil are wound. The two anode lead tab terminals are connected to the anode foil such that a position in the radial direction of the lead is shifted inward.

According to the electrolytic capacitor of the present invention, in order to ensure a prescribed pitch between the leads, a distance between the connection portions of the lead tab terminals can be set longer. Consequently, while ensuring characteristics as the electrolytic capacitor, the lead tab terminal can be connected to the anode (cathode) foil in a stable manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a diagram showing results of evaluation of the electrolytic capacitor according to Example 1.

DESCRIPTION OF THE PREFERRED EMBODIMENTS

First Embodiment

Here, an electrolytic capacitor including two anode lead tab terminals and two cathode lead tab terminals, with a one-side pressed terminal being applied as the anode (cathode) lead tab terminal, will now be described.

Figure 1A:
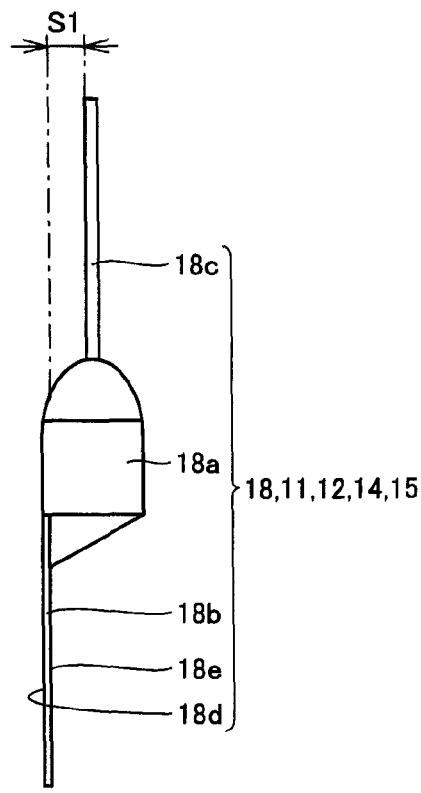
FIG. 1A is a side view showing one example of a one-side pressed terminal applied to an electrolytic capacitor in a first embodiment of the present invention.
Figure 1B:
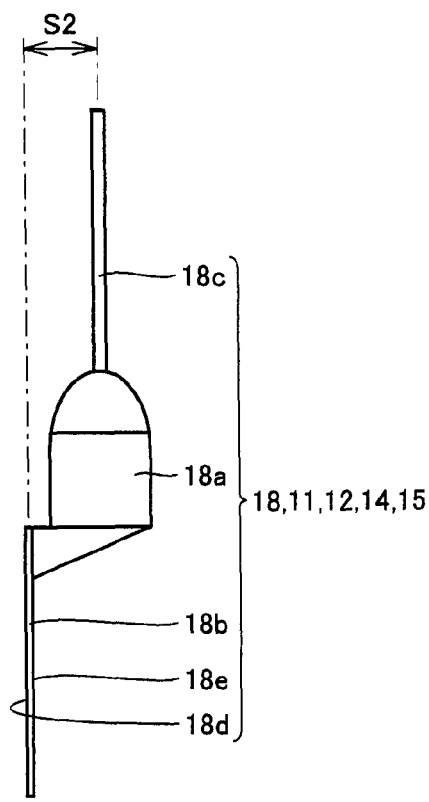
FIG. 1B is a side view showing another example of the one-side pressed terminal applied to the electrolytic capacitor in the first embodiment.

As shown in FIGS. 1A and 1B, a one-side pressed terminal 18 is molded asymmetrical with respect to lead 116c of a both-side pressed terminal 116 (see FIG. 27) by mainly using one mold of two identical molds. FIG. 1A shows a one-side pressed terminal relatively small in a shift amount (a distance S1) of a lead 18c with respect to a connection portion 18b, and FIG. 1B shows a one-side pressed terminal relatively great in a shift amount (a distance S2). In any one-side pressed terminal 18, a columnar boss portion 18a, plate-shaped connection portion 18b connected to an anode (cathode) foil, and columnar lead 18c serving as an anode (cathode) terminal are molded. Lead 18c is provided on one-end side of boss portion 18a, and connection portion 18b is provided on the other-end side of boss portion 18a.

in FIGS. 1A and 1B, plate-shaped connection portion 18b is arranged in a direction perpendicular to the sheet surface. In addition, regarding a surface of connection of this one-side pressed terminal 18 to the anode (cathode) foil, for the sake of illustration, a connection surface of connection portion 18b located opposite to the side where lead 18c is shifted with respect to connection portion 18b is defined as a first connection surface 18d, and a connection surface of connection portion 18b located on the side where lead 18c is shifted is defined as a second connection surface 18e. As will be described later, in one-side pressed terminal 18, lead 18c and boss portion 18a can be arranged at positions shifted in a radial direction from the position of connection portion 18b connected to the anode (cathode) foil.

Figure 2:
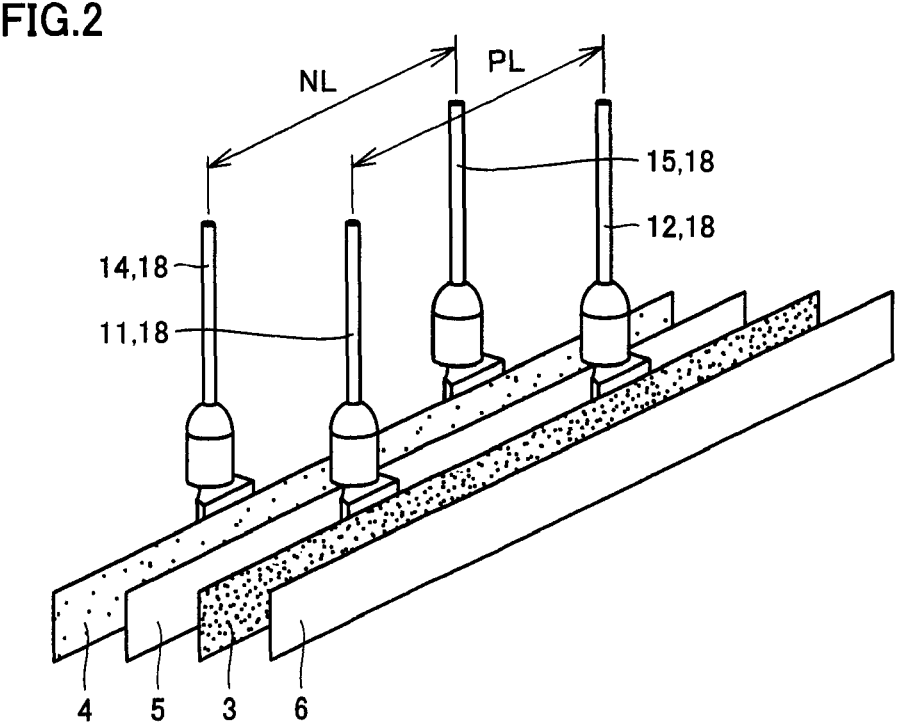
FIG. 2 is a perspective view showing a manner of connection of an anode (a cathode) lead tab terminal to an anode (a cathode) foil and a manner of arrangement of the anode (cathode) foil and a separator in the first embodiment.

A method of manufacturing an electrolytic capacitor will now be described. Initially, as shown in FIG. 2, at prescribed positions in a longitudinal direction of an anode foil 3, one-side pressed terminal 18 is connected as a first anode lead tab terminal 11 and one-side pressed terminal 18 is connected as a second anode lead tab terminal 12. In addition, at prescribed positions in a longitudinal direction of a cathode foil 4, one-side pressed terminal 18 is connected as a first cathode lead tab terminal 14 and one-side pressed terminal 18 is connected as a second cathode lead tab terminal 15.

Here, as will be described later, an interval PL between first anode lead tab terminal 11 and second anode lead tab terminal 12 is set to a length allowing stable connection of first anode lead tab terminal 11 and second anode lead tab terminal 12 to anode foil 3, with the use of a manufacturing apparatus. In addition, an interval NL between first cathode lead tab terminal 14 and second cathode lead tab terminal 15 is also set to a length allowing stable connection of first cathode lead tab terminal 14 and second cathode lead tab terminal 15 to cathode foil 4.

Figure 3:
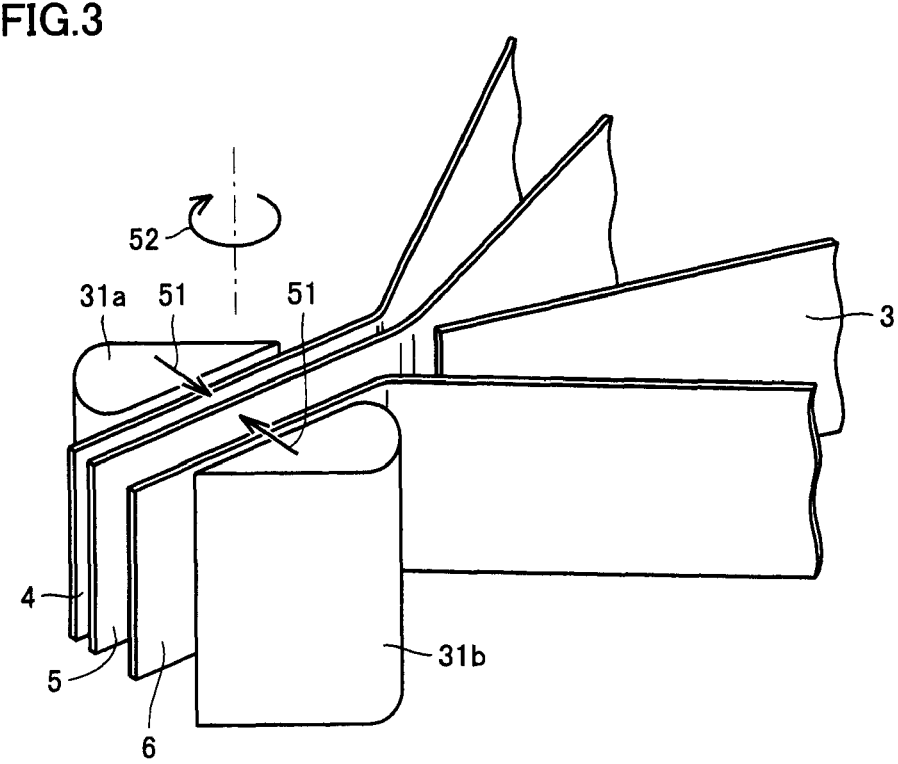
FIG. 3 is a partial perspective view showing one step of a method of manufacturing an electrolytic capacitor in the first embodiment.
Figure 4:
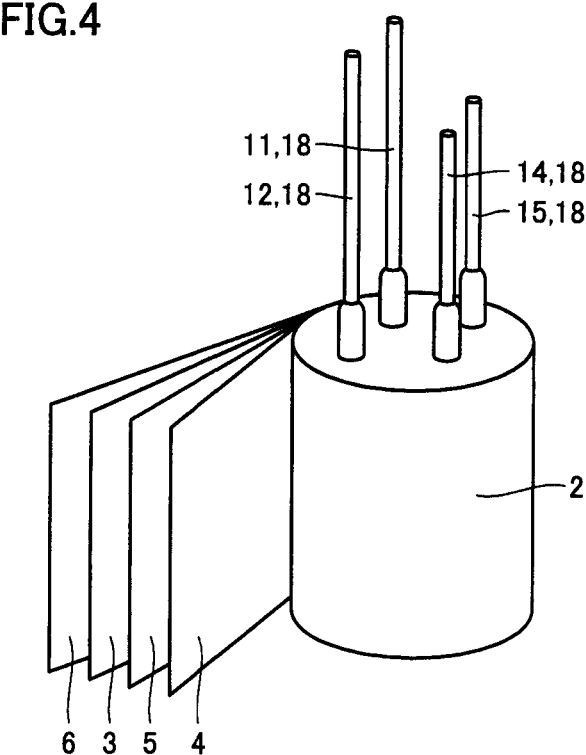
FIG. 4 is a perspective view showing a step performed subsequent to the step shown in FIG. 3 in the first embodiment.

Then, as shown in FIG. 2, anode foil 3 and cathode foil 4 are arranged in such a manner that one sheet of separator paper 5 is sandwiched between anode foil 3 and cathode foil 4 and anode foil 3 is sandwiched between one sheet of separator paper 5 and the other sheet of separator paper 6. Then, as shown in FIG. 3, one-end sides of arranged anode foil 3, cathode foil 4 and sheets of separator paper 5, 6 are sandwiched between core 31a and core 31b as shown with an arrow 51. Then, by turning cores 31a, 31b clockwise as shown with an arrow 52 in that state, anode foil 3, cathode foil 4 and the like are wound up from the one-end side in such a manner that first anode (cathode) lead tab terminal 11, 14 and second anode (cathode) lead tab terminal 12, 15 are located on an inner circumferential surface of anode (cathode) foil 3, 4, to thereby form a capacitor element 2 as shown in FIG. 4.

Then, a cut surface or the like of the anode foil or the like of capacitor element 2 is subjected to chemical conversion treatment and further to heat treatment at a temperature approximately from 150° C. to 300° C. Then, capacitor element 2 is impregnated with a solution mixture of a monomer forming a conductive polymer through polymerization, such as 3,4-ethylenedioxythiophene, and a ferric p-toluenesulfonate alcohol solution representing an oxidizing agent solution. Thereafter, through thermochemical polymerization, a conductive polymer layer (not shown) is formed between electrodes of capacitor element 2. Other than these materials, a conductive polymer material such as polypyrrole, polyfuran or polyaniline, or TCNQ complex salt (7,7,8,8-tetracyanoquinodimethane) may be used as an electrolyte.

Figure 5:
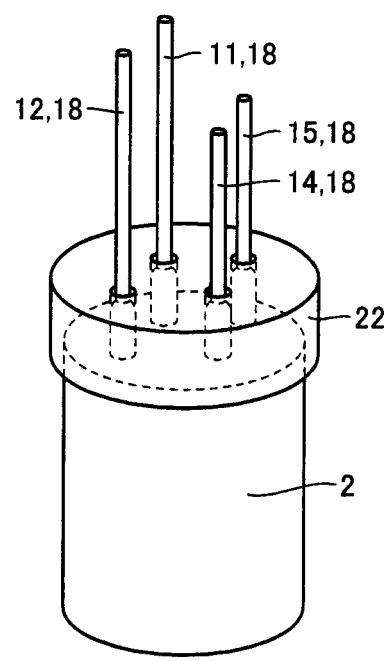
FIG. 5 is a perspective view showing a step performed subsequent to the step shown in FIG. 4 in the first embodiment.
Figure 6:
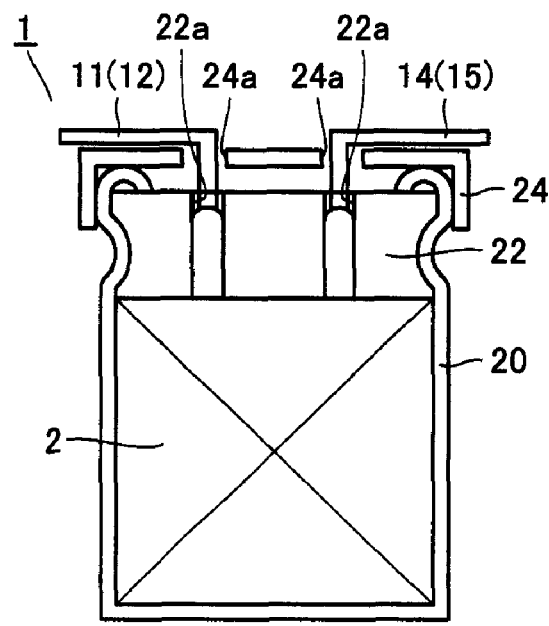
FIG. 6 is a cross-sectional view showing a step performed subsequent to the step shown in FIG. 5 in the first embodiment.
Figure 7:
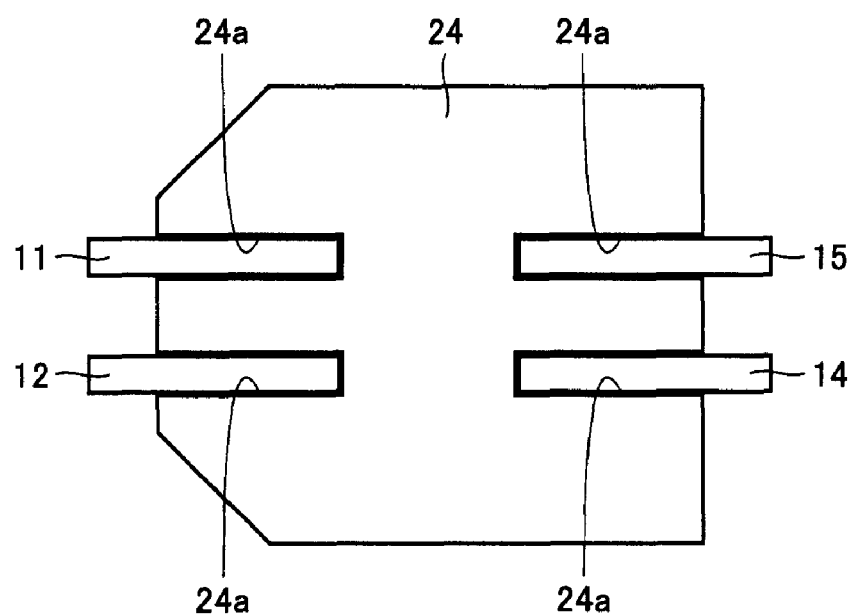
FIG. 7 is a top view in the step shown in FIG. 6 in the first embodiment.

Then, as shown in FIG. 5, a sealing rubber gasket 22 is attached to capacitor element 2. Then, capacitor element 2 is accommodated in an aluminum case 20 with a bottom (see FIG. 6) having a prescribed size. Then, an open-end side of aluminum case 20 is sealed by pressing in a lateral direction and curling and prescribed aging treatment is performed. Then, a seat plate 24 (see FIG. 6) made of plastic is attached to a curled surface of aluminum case 20. Thereafter, as shown in FIGS. 6 and 7, each lead 18c protruding through an opening 24a in seat plate 24 and serving as an electrode terminal is pressed and bent, to thereby complete an electrolytic capacitor 1 having a four-terminal structure.

In the electrolytic capacitor described above, one-side pressed terminal 18 is applied as first anode (cathode) lead tab terminal 11, 14, and that one-side pressed terminal 18 is connected to anode (cathode) foil 3, 4 in such a manner that a position in the radial direction of lead 18c is shifted inward after winding. In addition, one-side pressed terminal 18 is applied as second anode (cathode) lead tab terminal 12, 15, and that one-side pressed terminal 18 is connected to the anode (cathode) foil in such a manner that a position in the radial direction of lead 18c is shifted inward after winding. Thus, a pitch between opposing leads 18c can be narrowed, which will be described with reference to a Comparative Example.

Figure 8:
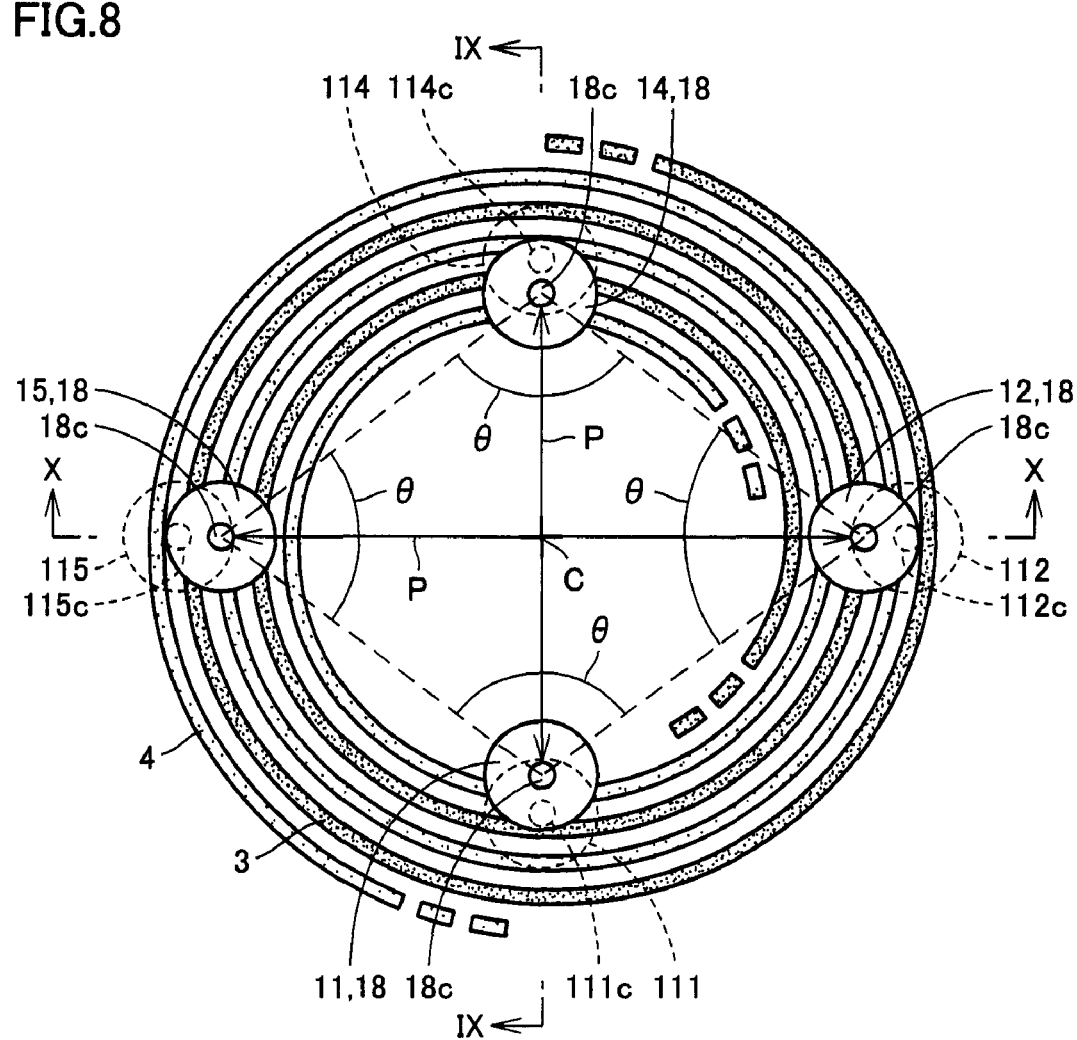
FIG. 8 is a plan view showing arrangement relation of anode (cathode) lead tab terminals in the first embodiment.
Figure 27:
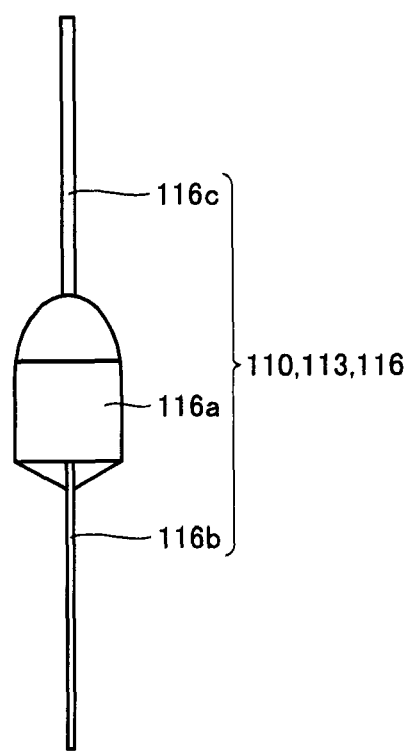
FIG. 27 is a side view showing the both-side pressed terminal.
Figure 28:
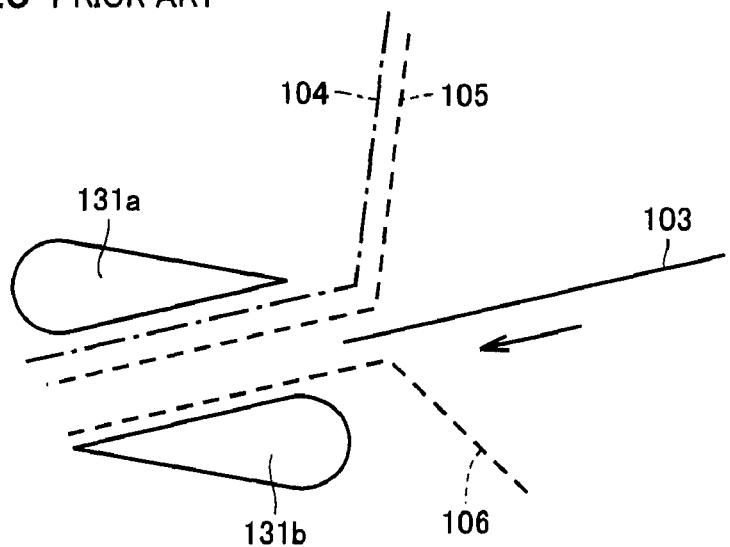
FIG. 28 is a perspective view showing one step of a method of manufacturing an electrolytic capacitor according to the first conventional technique.
Figure 29:
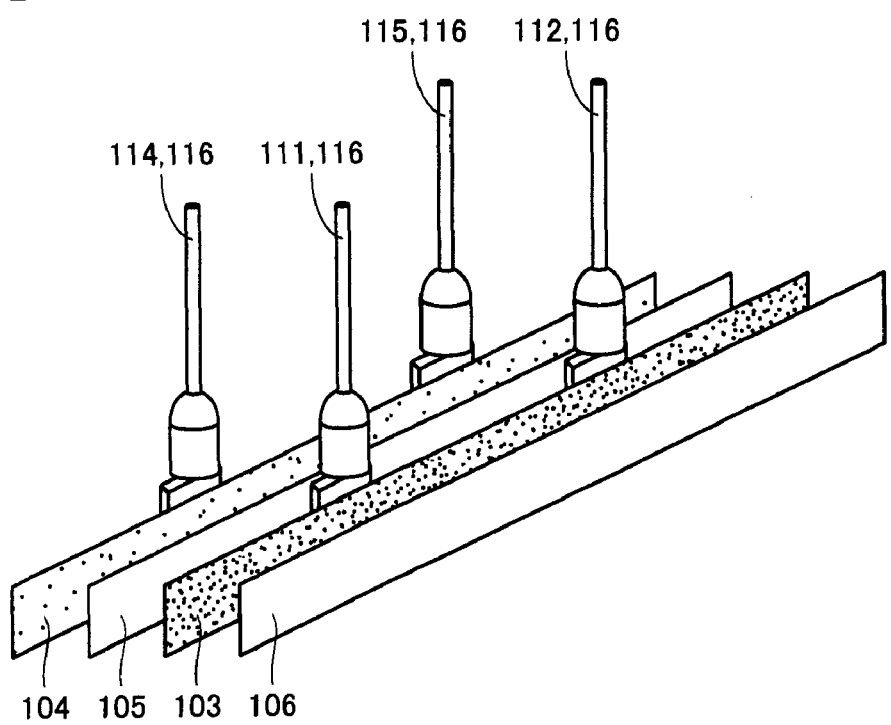
FIG. 29 is a perspective view showing one step of a method of manufacturing an electrolytic capacitor according to a second conventional technique.
Figure 30:
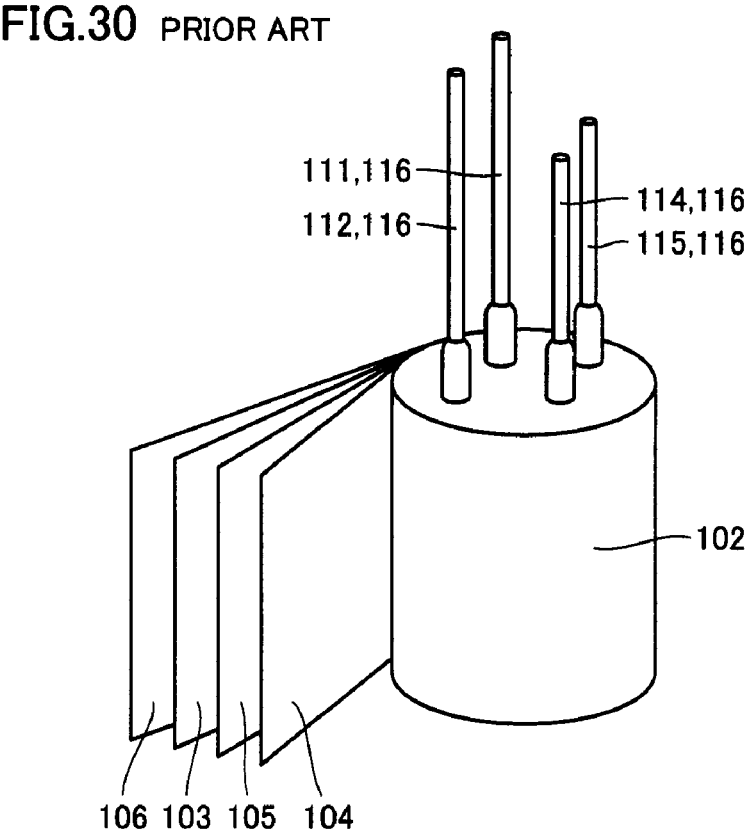
FIG. 30 is a perspective view showing a step performed subsequent to the step shown in FIG. 29.
Figure 31:
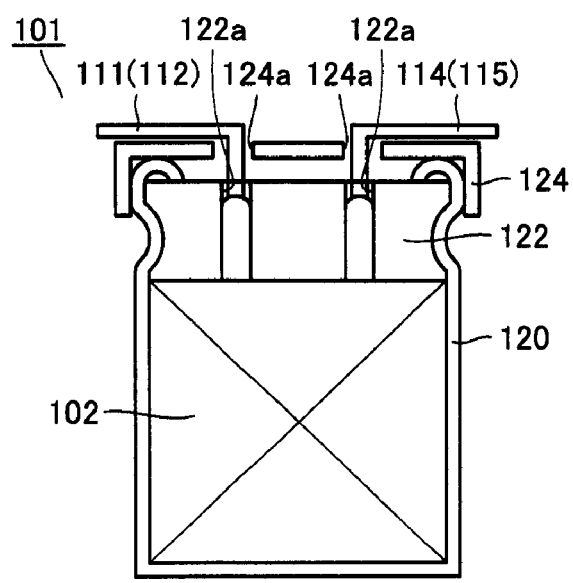
FIG. 31 is a cross-sectional view showing a step performed subsequent to the step shown in FIG. 30.
Figure 32:
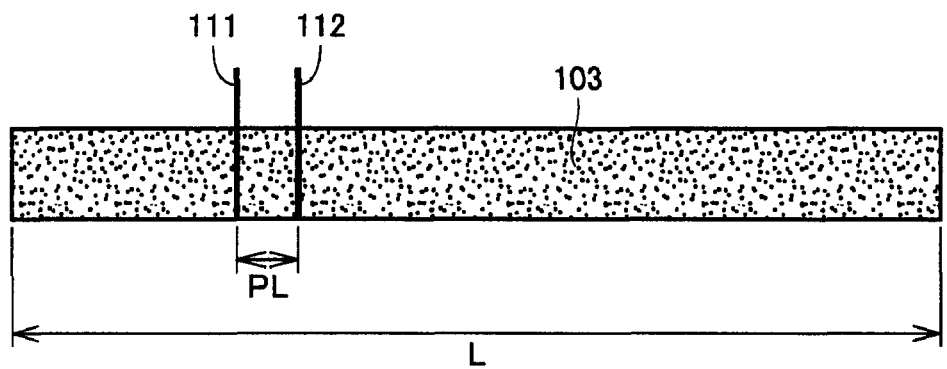
FIG. 32 is a side view showing a first example of a manner of connection of an anode lead tab terminal to an anode foil.
Figure 33:
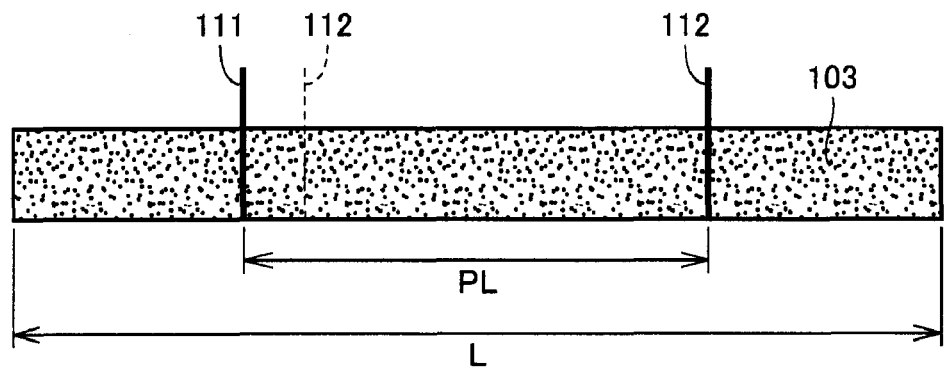
FIG. 33 is a side view showing a second example of a manner of connection of an anode lead tab terminal to an anode foil.
Figure 34:
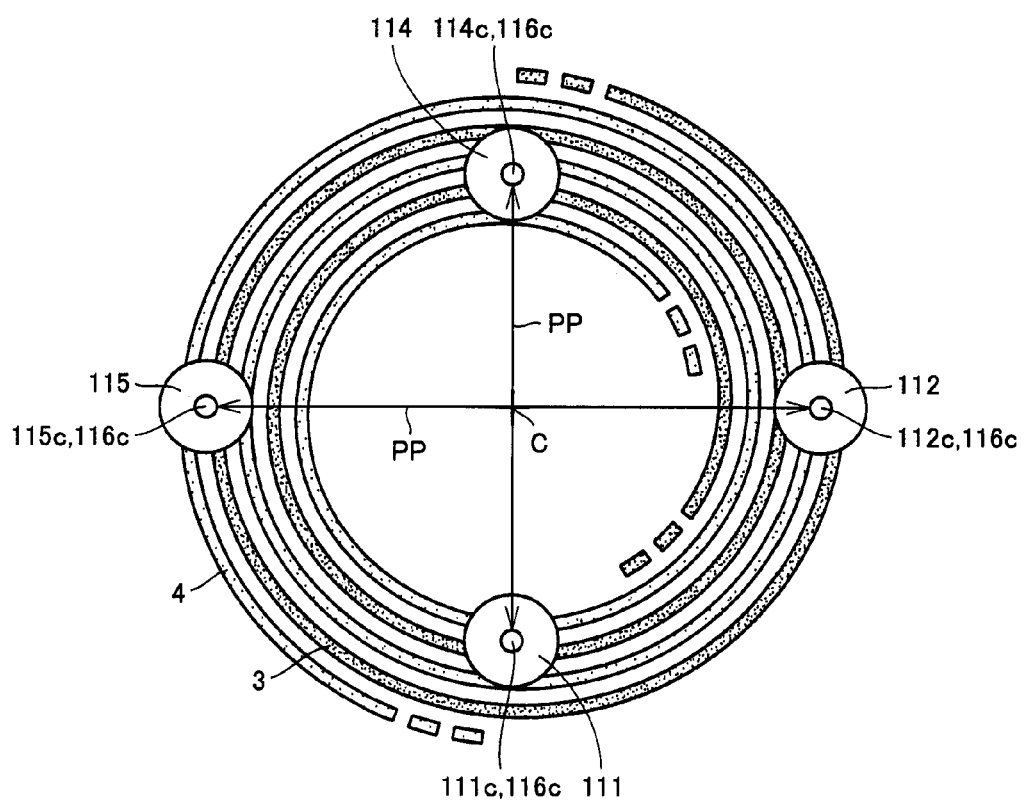
FIG. 34 is a plan view showing arrangement relation of anode (cathode) lead tab terminals for illustrating a problem of a conventional electrolytic capacitor.

Initially, in Comparative Example where both-side pressed terminal 116 shown in FIGS. 27 and 28 is applied as the first anode (cathode) lead tab terminal and the second anode (cathode) lead tab terminal, as shown in FIG. 8, lead 116c of first anode lead tab terminal 111 and lead 116c of second anode lead tab terminal 112 are arranged at positions in the radial direction corresponding to positions in the radial direction in wound anode foil 3 where respective connection portions 116b are connected. In addition, lead 116c of first cathode lead tab terminal 114 and lead 116c of second cathode lead tab terminal 115 are arranged at positions in the radial direction corresponding to positions in the radial direction in wound cathode foil 4 where respective connection portions 116b are connected.

Figure 9:
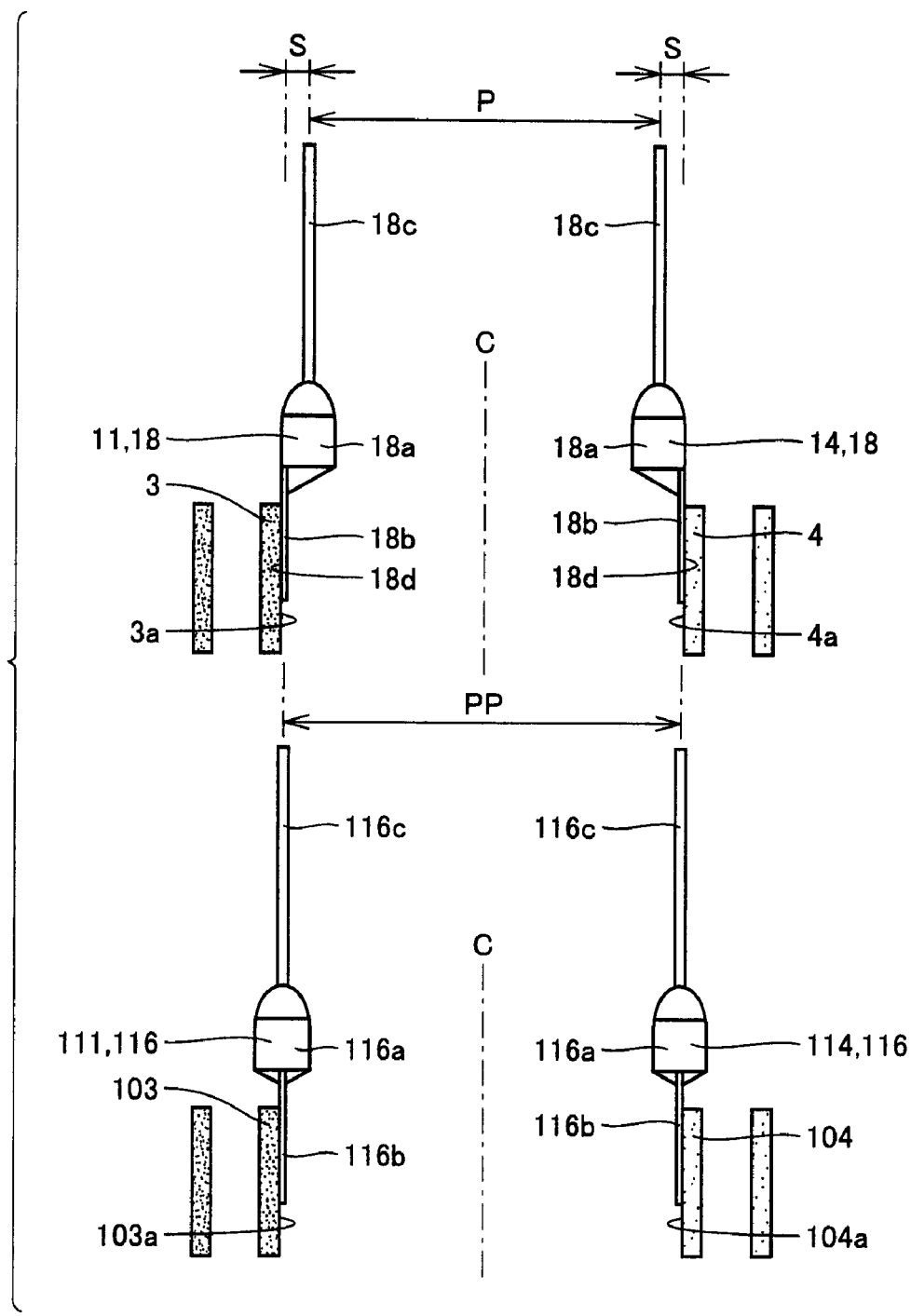
FIG. 9 is a cross-sectional view along the line IX-C-IX shown in FIG. 8 in the first embodiment and a cross-sectional view along that line in an electrolytic capacitor according to a Comparative Example.

Here, as shown in a lower portion of FIG. 9, a pitch between lead 116c of first anode lead tab terminal 111 and lead 116c of first cathode lead tab terminal 114 is denoted as PP. In addition, as shown in a lower portion of FIG. 10, a pitch between lead 116c of second anode lead tab terminal 112 and lead 116c of second cathode lead tab terminal 115 is denoted as PP. In FIG. 8 and the like, one-end sides of anode foil 3, cathode foil 4 and the like defined as the point of start of winding are shown as a central portion C.

In contrast, in the electrolytic capacitor described above, as shown in upper portions of FIGS. 9 and 10, one-side pressed terminal 18 is applied as first anode (cathode) lead tab terminal 11, 14 and second anode (cathode) lead tab terminal 12, 15. In addition, one-side pressed terminal 18 is connected to anode (cathode) foil 3, 4 in such a manner that first connection surface 18d of connection portion 18b of one-side pressed terminal 18 is in contact with an inner circumferential surface 3a, 4a of anode (cathode) foil 3, 4.

Figure 10:
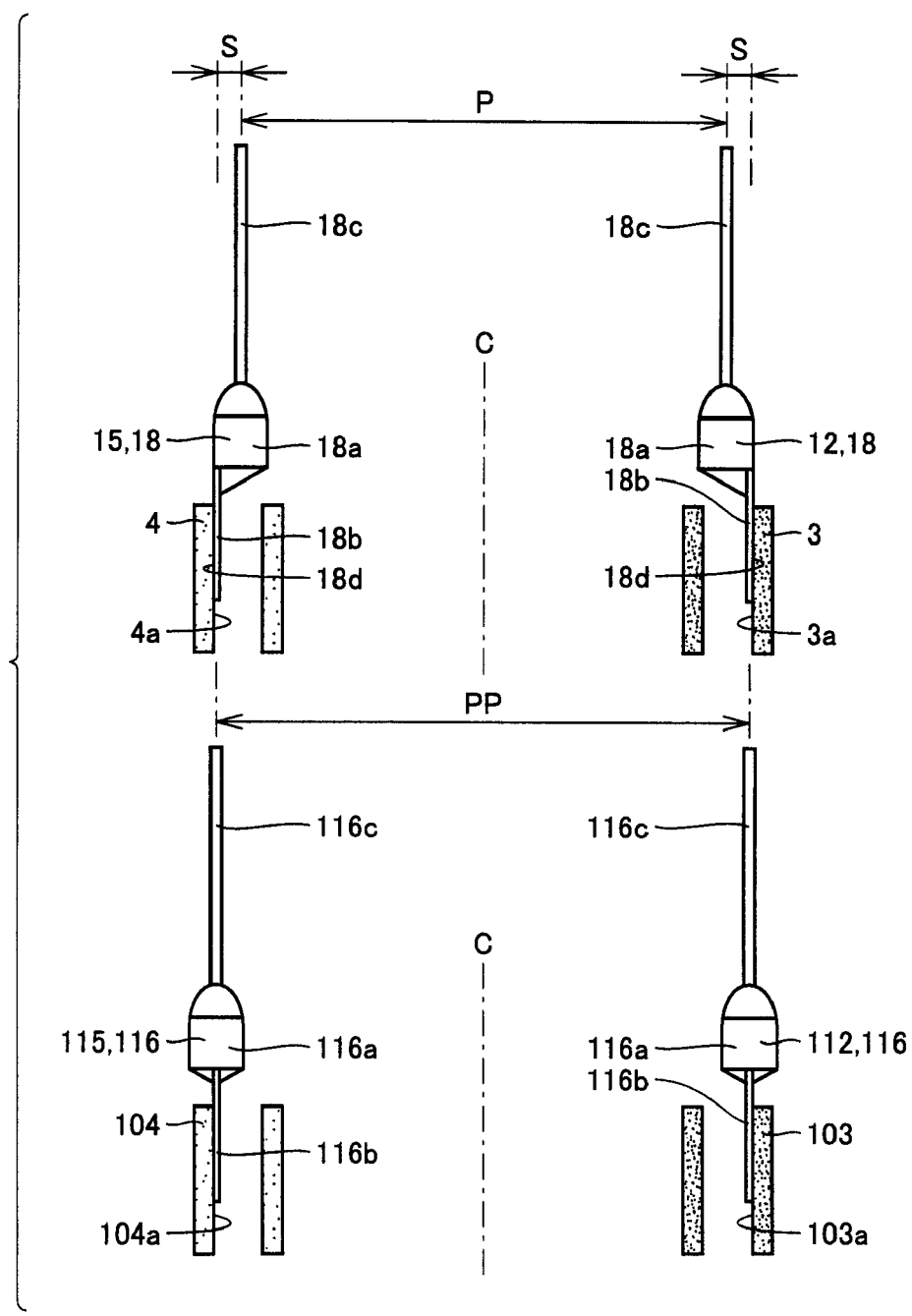
FIG. 10 is a cross-sectional view along the line X-C-X shown in FIG. 8 in the first embodiment and a cross-sectional view along that line in the electrolytic capacitor according to Comparative Example.

Therefore, though the position in the radial direction of connection portion 18b is not different from the position in the radial direction of connection portion 116b in a case where both-side pressed terminal 116 shown in the lower portions of FIGS. 9 and 10 is applied, the position in the radial direction of lead 18c (boss portion 18a) is shifted by a distance S toward the center (start of winding of anode foil 3 and the like) C side (inner side) of capacitor element 2 relative to the position in the radial direction of lead 116c (boss portion 116a) in a case where both-side pressed terminal 116 is applied.

Thus, as shown in FIGS. 8 and 9, a pitch P between lead 18c of first anode lead tab terminal 11 and lead 18c of first cathode lead tab terminal 14 that are opposed to each other with respect to center C is decreased to a pitch calculated by subtracting a shift amount (2×S) from pitch PP. In addition, as shown in FIGS. 8 and 10, pitch P between lead 18c of second anode lead tab terminal 12 and lead 18c of second cathode lead tab terminal 15 that are opposed to each other with respect to center C is also decreased to a pitch calculated by subtracting the shift amount (2×S) from pitch PP. In other words, in order to ensure a prescribed pitch, with the use of a one-side pressed terminal, a distance between the connection portions of the anode (cathode) lead tab terminals can be set longer than in a case of using a both-side pressed terminal.

Consequently, anode (cathode) lead tab terminal 11, 12, 14, 15 can be connected to anode (cathode) foil 3, 4 in a stable manner, without plate-shaped connection portions 18b of anode (cathode) lead tab terminals 11, 12, 14, 15 coming closer to one another, and desired pitch P is obtained without increasing a pitch between leads 18c opposed to each other with respect to center C. Characteristics as the electrolytic capacitor can thus be ensured.

In addition, normally, regarding the first anode (cathode) lead tab terminal, a distance from the one-end side of the anode (cathode) foil to a position of connection of the connection portion of the first anode (cathode) lead tab terminal tends to be short, and hence ESR characteristics of the electrolytic capacitor become poor. In order to address this, in the electrolytic capacitor described above, the position in the radial direction of lead 18c of first anode (cathode) lead tab terminal 11, 14 is shifted inward relative to the position in the radial direction of lead 116c of both-side pressed terminal 116, so that a distance from the one-end side of anode (cathode) foil 3, 4 to a position of connection of connection portion 18b of first anode (cathode) lead tab terminal 11, 14 can also be set longer than in a case where the both-side pressed terminal is applied. Thus, the ESR characteristics are improved and anode (cathode) foil 3, 4 can be wound up in a stable manner.

In the electrolytic capacitor manufactured as above, when viewed from the side where lead 18c protrudes, leads 18c of first (second) anode (cathode) lead tab terminals 11, 12, 14, 15 are arranged at positions corresponding to respective vertices of a quadrangle.

(Variation)

An electrolytic capacitor in which a connection portion of an anode (cathode) lead tab terminal is located on an inner circumferential surface of an anode (a cathode) foil in a state that the anode (cathode) foil and the like are wound up has been described by way of example of an electrolytic capacitor in the embodiment described above. A manner of arrangement of the anode (cathode) lead tab terminal and the anode (cathode) foil is not limited thereto, and an electrolytic capacitor in which a connection portion of an anode (cathode) lead tab terminal is located on an outer circumferential surface of an anode (a cathode) foil in a state that the anode (cathode) foil and the like are wound up is also applicable.

Figure 11:
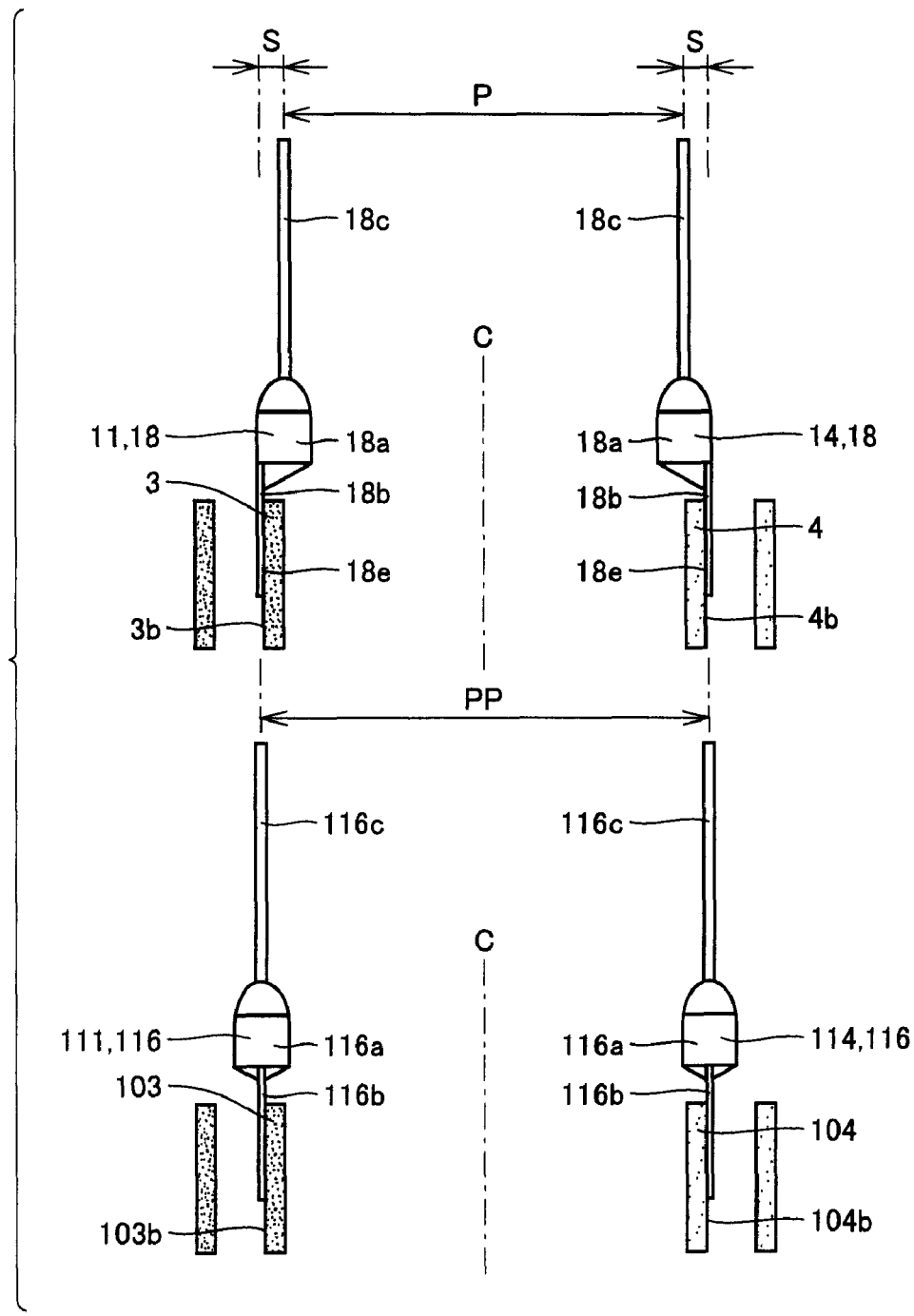
FIG. 11 is a cross-sectional view along the line IX-C-IX shown in FIG. 8 in an electrolytic capacitor according to a variation and a cross-sectional view along that line in an electrolytic capacitor according to a Comparative Example in the first embodiment.

In this electrolytic capacitor, as shown in an upper portion of FIG. 11, one-side pressed terminal 18 is connected to anode (cathode) foil 3, 4 in such a manner that second connection surface 18e of connection portion 18b of one-side pressed terminal 18 serving as first anode (cathode) lead tab terminal 11, 14 is in contact with an outer circumferential surface 3h, 4h of anode (cathode) foil 3, 4. In addition, as shown in an upper portion of FIG. 12, one-side pressed terminal 18 is connected to anode (cathode) foil 3, 4 in such a manner that second connection surface 18e of connection portion 18h of one-side pressed terminal 18 serving as second anode (cathode) lead tab terminal 12, is in contact with outer circumferential surface 3b, 4b of anode (cathode) foil 3, 4.

Figure 12:
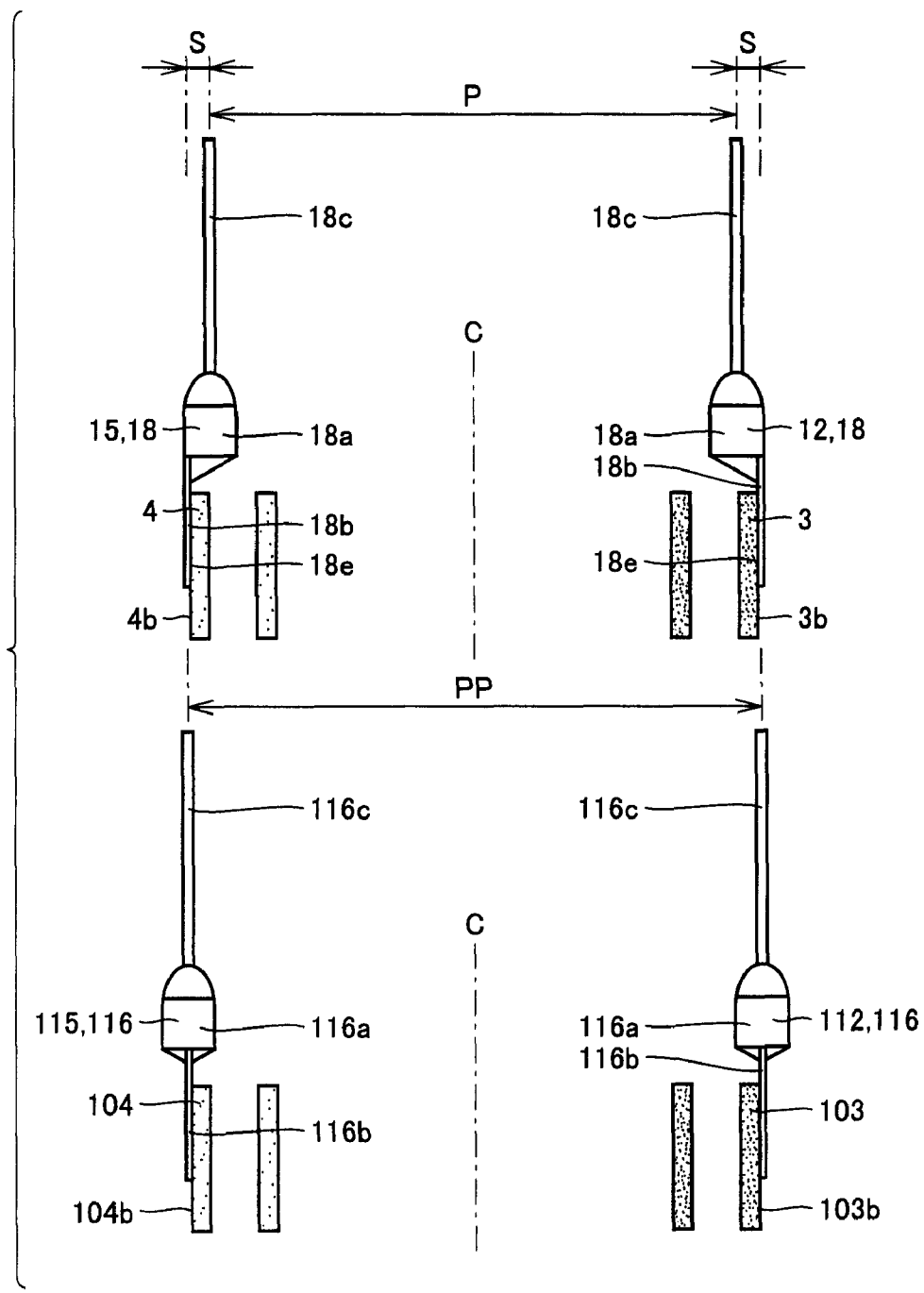
FIG. 12 is a cross-sectional view along the line X-C-X shown in FIG. 8 in the electrolytic capacitor according to the variation and a cross-sectional view along that line in the electrolytic capacitor according to Comparative Example in the first embodiment.

Therefore, though the position in the radial direction of connection portion 18b is not different from the position in the radial direction of connection portion 116b in a case where both-side pressed terminal 116 shown in the lower portions of FIGS. 11 and 12 is applied, the position in the radial direction of lead 18c (boss portion 18a) is shifted by distance S toward the center (start of winding of anode foil 3 and the like) C side (inner side) of capacitor element 2 relative to the position in the radial direction of lead 116c (boss portion 116a) in a case where both-side pressed terminal 116 is applied.

Thus, as shown in FIG. 11, pitch P between lead 18c of first anode lead tab terminal 11 and lead 18c of first cathode lead tab terminal 14 opposed to each other with respect to center C is narrowed by an amount (2×S) corresponding to the shift amount. In addition, as shown in FIG. 12, pitch P between lead 18c of second anode lead tab terminal 12 and lead 18c of second cathode lead tab terminal 15 opposed to each other with respect to center C is also narrowed by the amount (2×S) corresponding to the shift amount. In other words, in order to ensure a prescribed pitch, with the use of a one-side pressed terminal, a distance between the connection portions of the anode (cathode) lead tab terminals can be set longer than in a case of using a both-side pressed terminal.

Consequently, in the electrolytic capacitor in which the connection portion of the anode (cathode) lead tab terminal is located on the outer circumferential surface of the anode (cathode) foil as well, anode (cathode) lead tab terminal 11, 12, 14, 15 can be connected to anode (cathode) foil 3, 4 in a stable manner, without plate-shaped connection portions 18*b* of anode (cathode) lead tab terminals 11, 12, 14, 15 coming closer to one another, and desired pitch P is obtained without increasing a pitch between leads 18*c* opposed to each other with respect to center C. Characteristics as the electrolytic capacitor can thus be ensured.

Example 1

The inventors fabricated as Example 1, electrolytic capacitors in which a one-side pressed terminal was applied as the first anode (cathode) lead tab terminal and the second anode (cathode) lead tab terminal, diameters thereof being set to 5.0 mm, 6.3 mm, 8.0 mm, 10.0 mm, 12.5 mm, and 16.0 mm, respectively, and pitches between the leads being set to 2.0 mm, 2.5 mm, 3.5 mm, 5.0 mm, 5.0 mm, and 7.5 mm, respectively. In addition, an interval between the first anode (cathode) lead tab terminal and the second anode (cathode) lead tab terminal was set to a length corresponding to approximately ¾ of a circumference (see FIG. 13). On the other hand, the inventors fabricated as a Comparative Example, electrolytic capacitors having the same size and the same pitch as above, in which a both-side pressed terminal was applied.

The electrolytic capacitors in Example and Comparative Example were evaluated in terms of an angle θ (see FIG. 8) of one vertex of a quadrangle formed by connecting to one another, points where leads of four anode (cathode) lead tab terminals are located and distance PL, NL (see FIG. 2) between first anode (cathode) lead tab terminal 11, 14 and second anode (cathode) lead tab terminal 12, 15 before winding. Then, a sample of which angle θ was within a range of 90±20° and of which distance PL, NL not smaller than 7.0 mm was ensured was determined as a conforming product and a sample in which at least one of angle θ and distance PL, NL did not satisfy the requirement above was determined as a defective product.

FIG. 13 shows the results. Among the fabricated samples, a sample of which percentage of conforming products was 95% or higher was indicated with a circle and a sample of which percentage of conforming products was lower than 95% was indicated with v. As shown in FIG. 13, it can be seen that, as the size of the capacitor is smaller, the connection portions of the lead tab terminals come closer to each other in Comparative Example and a percentage of conforming products becomes poor. On the other hand, in Example, a distance between the connection portions of the anode (cathode) lead tab terminals can be set longer for the same pitch. Thus, even in a case where a size of a capacitor is small in particular, it was demonstrated that the anode (cathode) lead tab terminal can be connected to the anode (cathode) foil in a stable manner and the percentage of conforming products can be ensured.

Second Embodiment

Here, an electrolytic capacitor including two anode lead tab terminals and one cathode lead tab terminal, with a one-side pressed terminal being applied as the anode (cathode) lead tab terminal, will be described.

Figure 14:
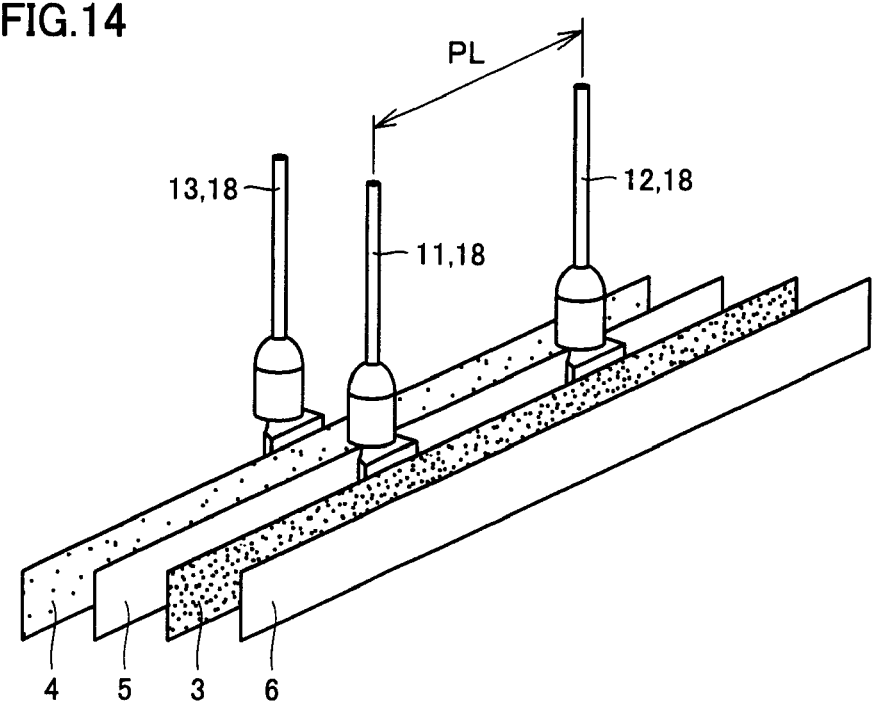
FIG. 14 is a perspective view showing a manner of connection of an anode (a cathode) lead tab terminal to an anode (a cathode) foil and a manner of arrangement of the anode (cathode) foil and a separator in an electrolytic capacitor according to a second embodiment of the present invention.

Initially, a method of manufacturing an electrolytic capacitor will be described. As shown in FIG. 14, at prescribed positions in a longitudinal direction of anode foil 3, one-side pressed terminal 18 is connected as first anode lead tab terminal 11 and one-side pressed terminal 18 is connected as second anode lead tab terminal 12. In addition, at a prescribed position in a longitudinal direction of cathode foil 4, one-side pressed terminal 18 is connected as a cathode lead tab terminal 13.

Here, as described previously, interval PL between first anode lead tab terminal 11 and second anode lead tab terminal 12 is set to a length allowing stable connection of first anode lead tab terminal 11 and second anode lead tab terminal 12 to anode foil 3, with the use of the manufacturing apparatus.

Then, as in FIG. 3, anode foil 3 and cathode foil 4 are arranged in such a manner that one sheet of separator paper 5 is sandwiched between anode foil 3 and cathode foil 4 and anode foil 3 is sandwiched between one sheet of separator paper 5 and the other sheet of separator paper 6.

Figure 15:
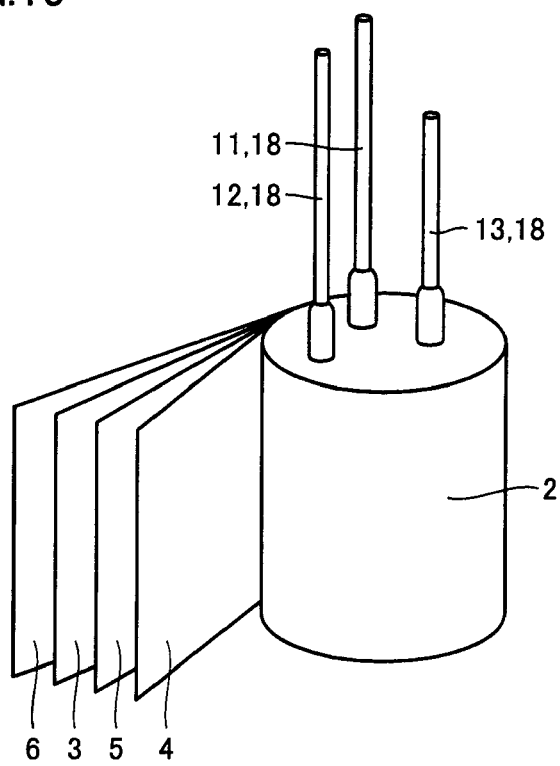
FIG. 15 is a perspective view showing one step of a method of manufacturing an electrolytic capacitor in the second embodiment.

Then, one-end sides of arranged anode foil 3, cathode foil 4 and sheets of separator paper 5, 6 are sandwiched between core 31*a* and core 31*b* as shown with arrow 51. Then, by turning cores 31*a*, 31*b* clockwise as shown with arrow 52 in that state, anode foil 3, cathode foil 4 and the like are wound up from the one-end side in such a manner that first anode lead tab terminal 11, second anode lead tab terminal 12 and cathode lead tab terminal 13 are located on the inner circumferential surface of anode (cathode) foil 3, 4, to thereby form capacitor element 2 as shown in FIG. 15.

Figure 16:
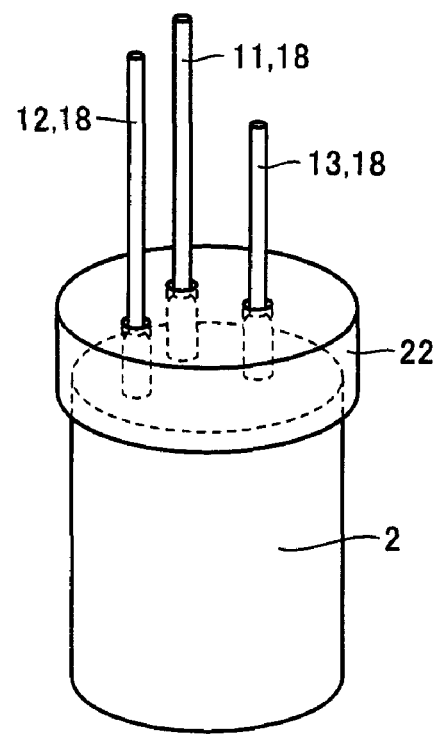
FIG. 16 is a perspective view showing a step performed subsequent to the step shown in FIG. 15 in the second embodiment.

Then, with a method similar to the method described previously, a cut surface or the like of the anode foil or the like of capacitor element 2 is subjected to chemical conversion treatment so as to form a conductive polymer layer (not shown) between electrodes of capacitor element 2. Then, as shown in FIG. 16, sealing rubber gasket 22 is attached to capacitor element 2. Then, capacitor element 2 to which sealing rubber gasket 22 is attached is accommodated in aluminum case 20 with a bottom (see FIG. 17) having a prescribed size.

Figure 17:
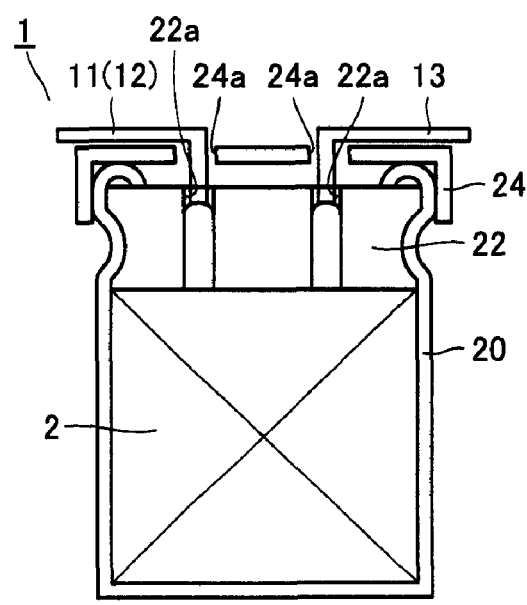
FIG. 17 is a cross-sectional view showing a step performed subsequent to the step shown in FIG. 16 in the second embodiment.
Figure 18:
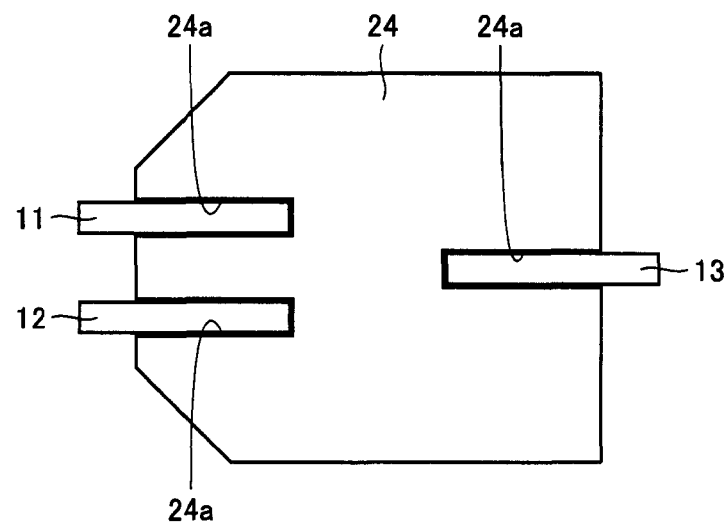
FIG. 18 is a top view in the step shown in FIG. 17 in the second embodiment.

Then, an open-end side of aluminum case 20 is sealed by pressing in a lateral direction and curling and prescribed aging treatment is performed. Then, seat plate 24 made of plastic is attached to a curled surface of aluminum case 20. Thereafter, as shown in FIGS. 17 and 18, each lead 18*c* protruding through opening 24*a* in seat plate 24 and serving as an electrode terminal is pressed and bent, to thereby complete electrolytic capacitor 1 having a three-terminal structure.

In the electrolytic capacitor described above, one-side pressed terminal 18 is applied as first anode lead tab terminal 11 and that one-side pressed terminal 18 is connected to anode foil 3 in such a manner that the position in the radial direction of lead 18*c* is shifted inward after winding. In addition, one-side pressed terminal 18 is applied as second anode lead tab terminal 12 and that one-side pressed terminal 18 is connected to anode foil 3 in such a manner that the position in the radial direction of lead 18*c* is shifted inward after winding. Moreover, one-side pressed terminal 18 is applied as cathode lead tab terminal 13 and that one-side pressed terminal 18 is connected to cathode foil 4 in such a manner that the position in the radial direction of lead 18*c* is shifted inward after winding. Thus, a pitch between opposing leads 18*c* can be narrowed, which will be described with reference to a Comparative Example.

Figure 19:
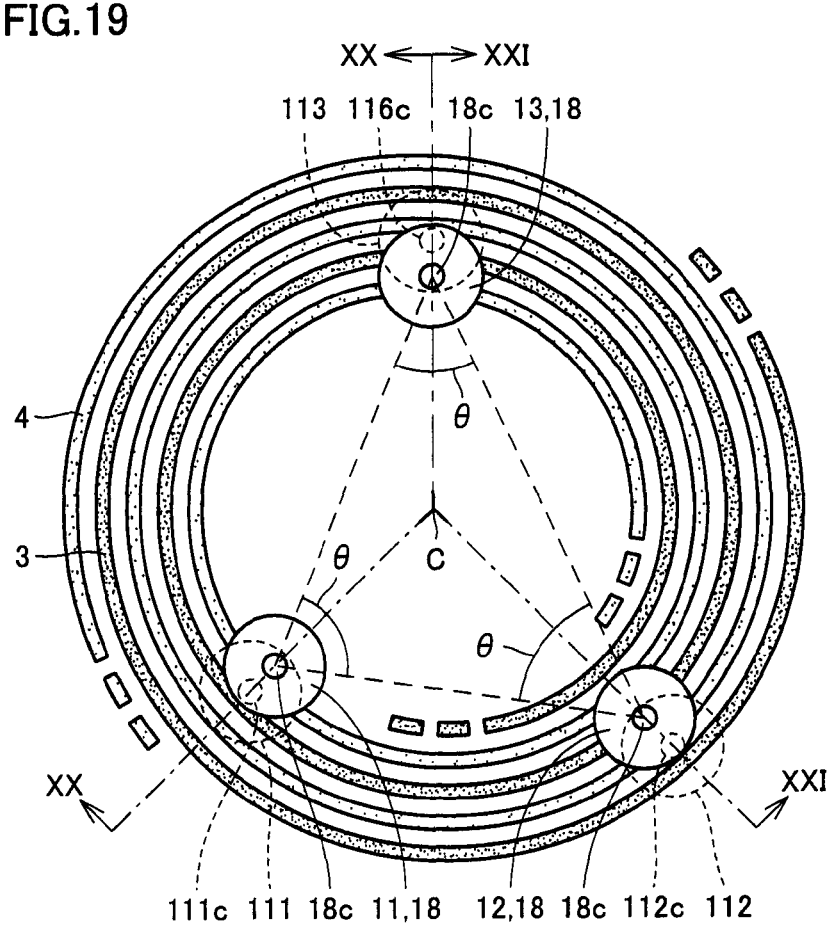
FIG. 19 is a plan view showing arrangement relation of anode (cathode) lead tab terminals in the second embodiment.
Figure 26:
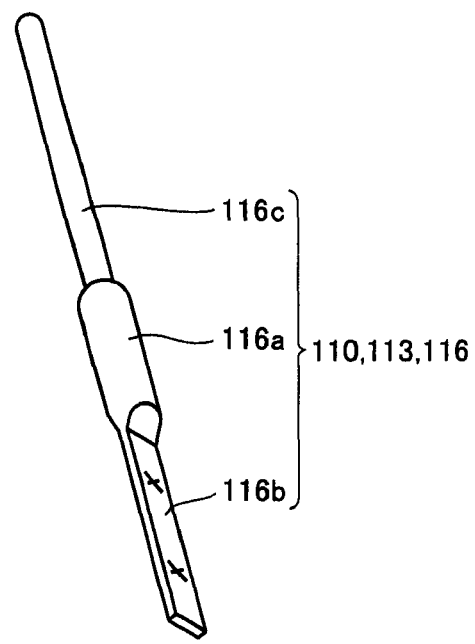
FIG. 26 is a perspective view showing a both-side pressed terminal.

Initially, in Comparative Example where both-side pressed terminal 116 shown in FIGS. 26 and 27 is applied as the first (second) anode lead tab terminal and the cathode lead tab terminal, as shown in FIG. 19, lead 116*c* of first anode lead tab terminal 111 and lead 116c of second anode lead tab terminal 112 are arranged at positions in the radial direction corresponding to the positions in the radial direction in wound anode foil 3 where respective connection portions 116b are connected. In addition, lead 116c of cathode lead tab terminal 113 is arranged at the position in the radial direction corresponding to the position in the radial direction in wound cathode foil 4 where connection portion 116b is connected.

Figure 20:
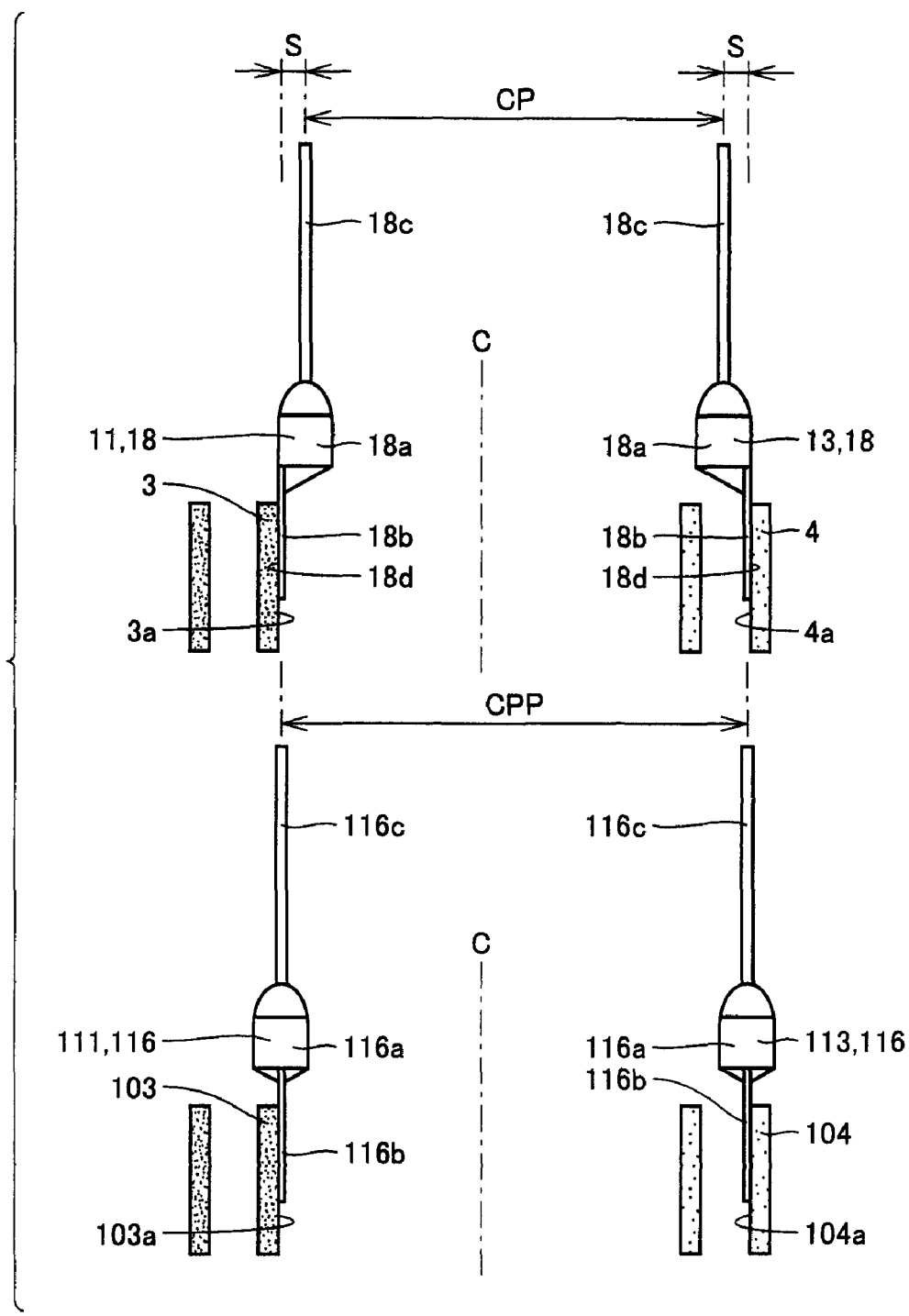
FIG. 20 is a cross-sectional view along the line XX-C-XX shown in FIG. 19 in the second embodiment and a cross-sectional view along that line in an electrolytic capacitor according to a Comparative Example.

Here, as shown in a lower portion of FIG. 20, a distance via central portion C between lead 116c of first anode lead tab terminal 111 and lead 116c of cathode lead tab terminal 113 is denoted as a distance CPP. In addition, as shown in a lower portion of FIG. 21, a distance via central portion C between lead 116c of second anode lead tab terminal 112 and lead 116c of cathode lead tab terminal 113 is denoted as distance CPP.

In contrast, in the electrolytic capacitor described above, as shown in upper portions of FIGS. 20 and 21, one-side pressed terminal 18 is applied as first (second) anode lead tab terminal 11, 12 and cathode lead tab terminal 13. In addition, one-side pressed terminal 18 is connected to anode (cathode) foil 3, 4 in such a manner that first connection surface 18d of connection portion 18b of one-side pressed terminal 18 is in contact with inner circumferential surface 3a, 4a of anode (cathode) foil 3, 4.

Figure 21:
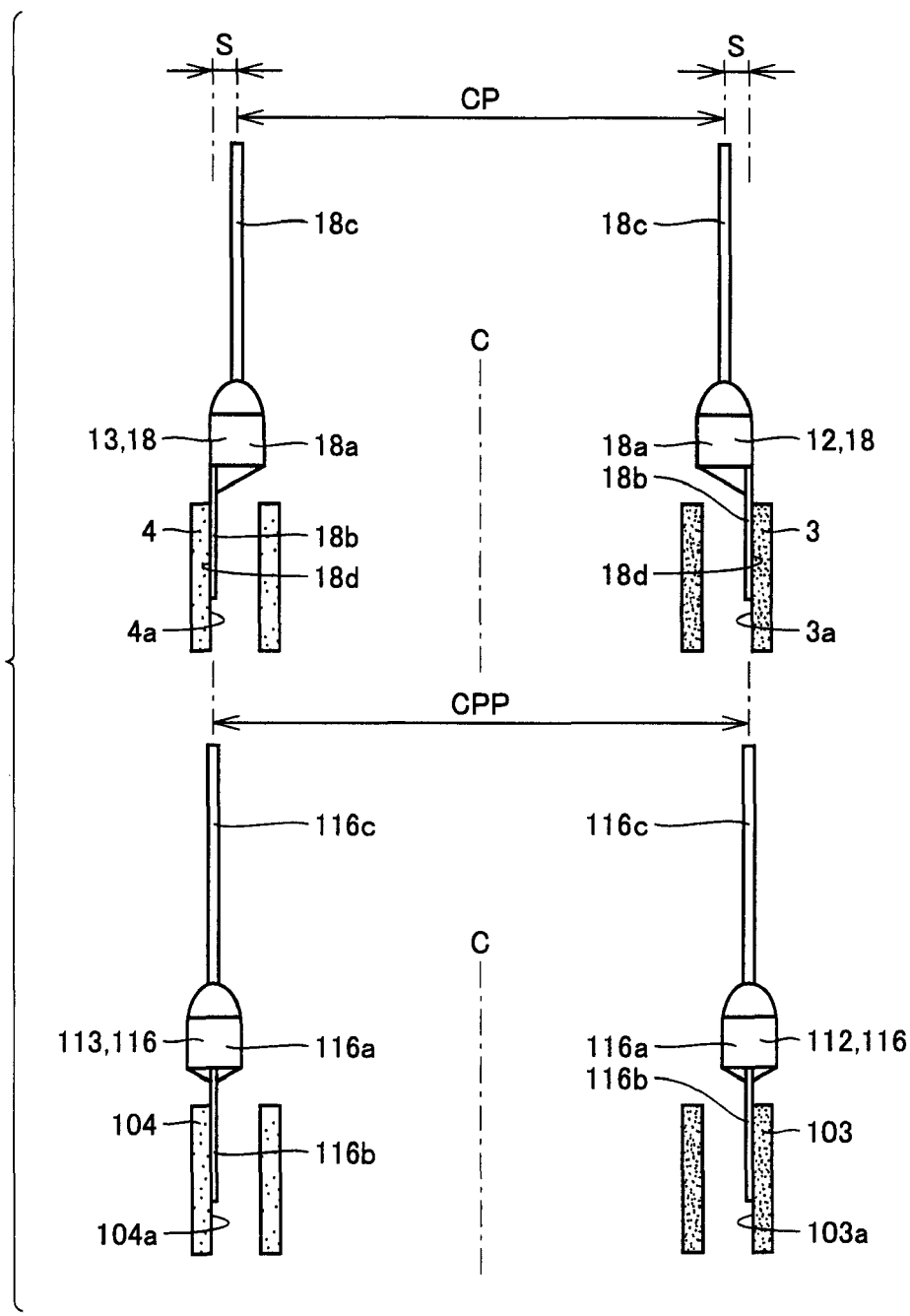
FIG. 21 is a cross-sectional view along the line XXI-C-XXI shown in FIG. 19 in the second embodiment and a cross-sectional view along that line in the electrolytic capacitor according to Comparative Example.

Therefore, though the position in the radial direction of connection portion 18b is not different from the position in the radial direction of connection portion 116b in a case where both-side pressed terminal 116 shown in the lower portions of FIGS. 20 and 21 is applied, the position in the radial direction of lead 18c (boss portion 18a) is shifted by distance S toward the center (start of winding of anode foil 3 and the like) C side (inner side) of capacitor element 2 relative to the position in the radial direction of lead 116c (boss portion 116a) in a case where both-side pressed terminal 116 is applied.

Thus, as shown in FIGS. 19 and 20, a distance CP via central portion C between lead 18c of first anode lead tab terminal 11 and lead 18c of cathode lead tab terminal 13 is decreased to a distance calculated by subtracting a shift amount (2×S) from distance CPP. In addition, as shown in FIGS. 19 and 21, distance CP via central portion C between lead 18c of second anode lead tab terminal 12 and lead 18c of cathode lead tab terminal 13 is also decreased to a distance calculated by subtracting the shift amount (2×<S) from distance CPP. As distance CP via central portion C is decreased, a pitch between the lead of the anode lead tab terminal and the lead of the cathode lead tab terminal is also decreased. In other words, in order to ensure a prescribed pitch, with the use of a one-side pressed terminal, a distance between the connection portions of the anode lead tab terminals can be set longer than in a case of using a both-side pressed terminal.

Consequently, anode lead tab terminal 11, 12 can be connected to anode foil 3 in a stable manner, without plate-shaped connection portions 18b of anode lead tab terminals 11, 12 coming closer to each other, and desired pitch CP is obtained without increasing a pitch between opposing leads 18c. Characteristics as the electrolytic capacitor can thus be ensured.

(Variation)

An electrolytic capacitor in which a connection portion of an anode (cathode) lead tab terminal is located on an inner circumferential surface of an anode (a cathode) foil in a state that the anode (cathode) foil and the like are wound up has been described by way of example of an electrolytic capacitor in the embodiment described above. A manner of arrangement of the anode (cathode) lead tab terminal and the anode (cathode) foil is not limited thereto, and an electrolytic capacitor in which a connection portion of an anode (cathode) lead tab terminal is located on an outer circumferential surface of an anode (a cathode) foil in a state that the anode (cathode) foil and the like are wound up is also applicable.

Figure 22:
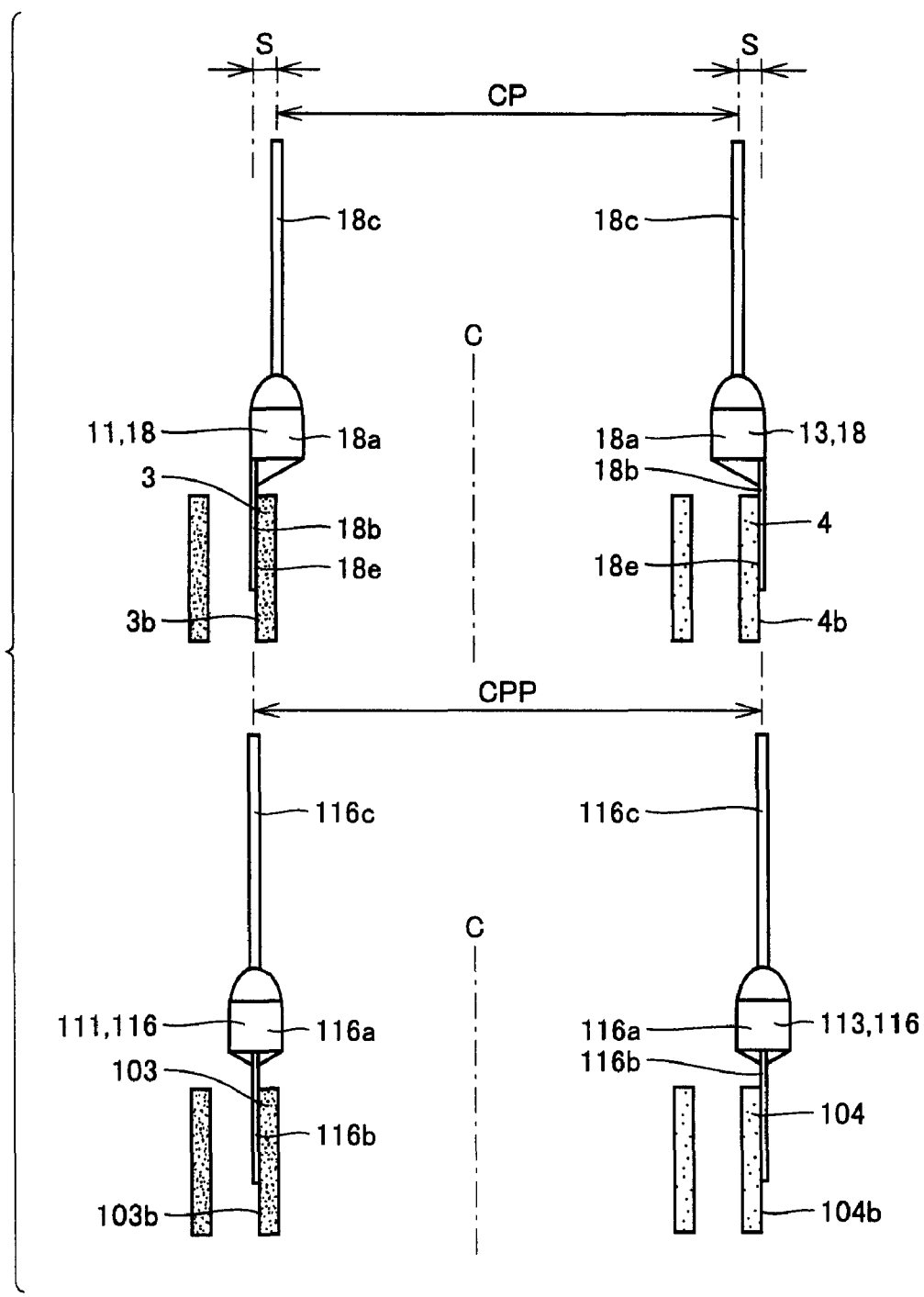
FIG. 22 is a cross-sectional view along the line XX-C-XX shown in FIG. 19 in an electrolytic capacitor according to a variation and a cross-sectional view along that line in an electrolytic capacitor according to a Comparative Example in the second embodiment.

In this electrolytic capacitor, as shown in an upper portion of FIG. 22, one-side pressed terminal 18 is connected to anode foil 3 in such a manner that second connection surface 18e of connection portion 18b of one-side pressed terminal 18 serving as first anode lead tab terminal 11 is in contact with outer circumferential surface 3b of anode foil 3 and one-side pressed terminal 18 is connected to cathode foil 4 in such a manner that second connection surface 18e of connection portion 18b of one-side pressed terminal 18 serving as cathode lead tab terminal 13 is in contact with outer circumferential surface 4b of cathode foil 4.

Figure 23:
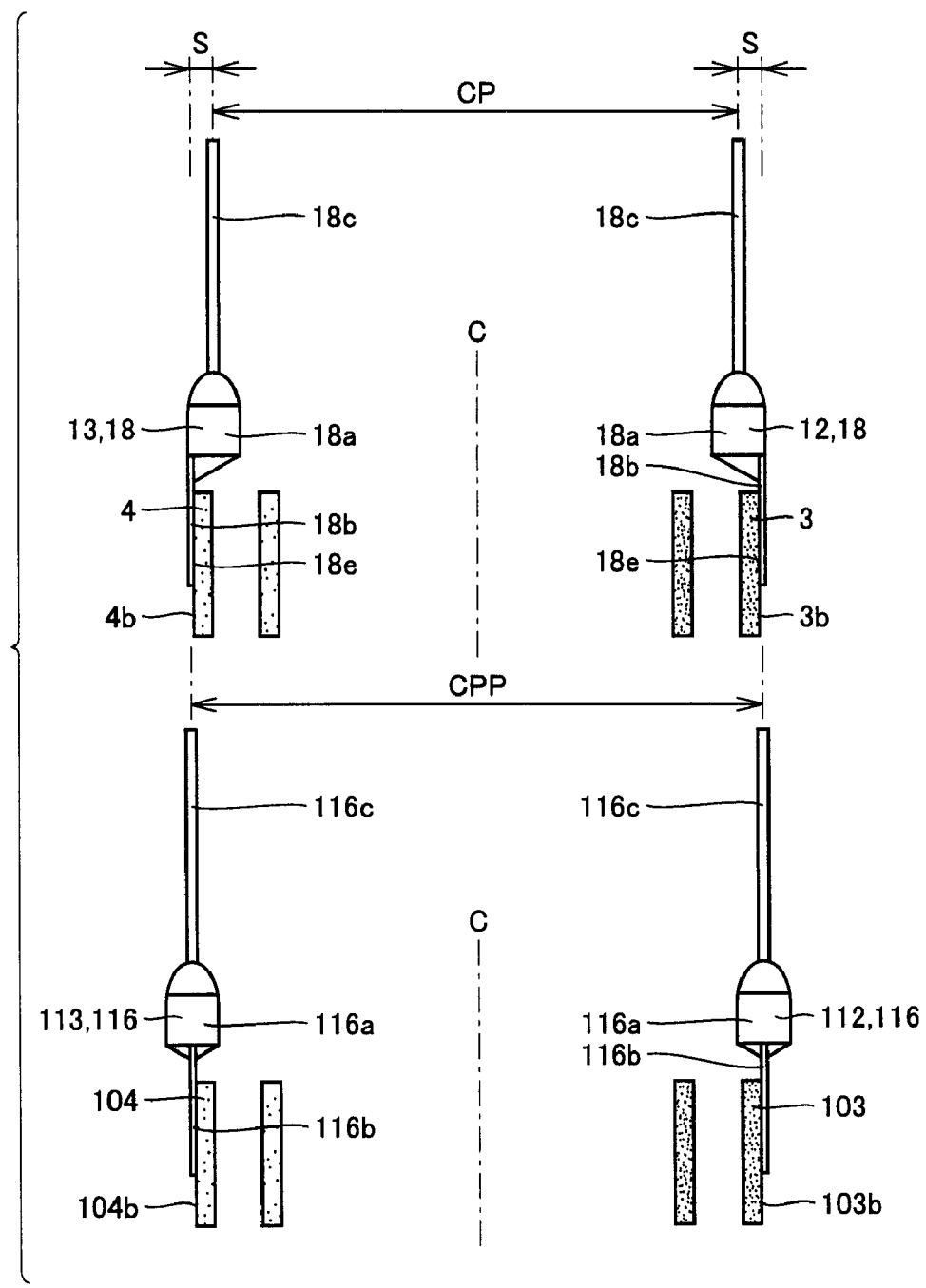
FIG. 23 is a cross-sectional view along the line XXI-C-XXI shown in FIG. 19 in the electrolytic capacitor according to the variation and a cross-sectional view along that line in the electrolytic capacitor according to Comparative Example in the second embodiment.

In addition, as shown in an upper portion of FIG. 23, one-side pressed terminal 18 is connected to anode foil 3 in such a manner that second connection surface 18e of connection portion 18b of one-side pressed terminal 18 serving as second anode lead tab terminal 12 is in contact with outer circumferential surface 3b of anode foil 3 and one-side pressed terminal 18 is connected to cathode foil 4 in such a manner that second connection surface 18e of connection portion 18b of one-side pressed terminal 18 serving as cathode lead tab terminal 13 is in contact with outer circumferential surface 4b of cathode foil 4.

Therefore, though the position in the radial direction of connection portion 18b is not different from the position in the radial direction of connection portion 116b in a case where both-side pressed terminal 116 shown in the lower portions of FIGS. 22 and 23 is applied, the position in the radial direction of lead 18c (boss portion 18a) is shifted by distance S toward the center (start of winding of anode foil 3 and the like) C side (inner side) of capacitor element 2 relative to the position in the radial direction of lead 116c (boss portion 116a) in a case where both-side pressed terminal 116 is applied.

Thus, as shown in FIG. 22, distance CP via central portion C between lead 18c of first anode lead tab terminal 11 and lead 18c of cathode lead tab terminal 13 is decreased to a distance calculated by subtracting a shift amount (2×S) from distance CPP. In addition, as shown in FIG. 23, distance CP via central portion C between lead 18c of second anode lead tab terminal 12 and lead 18c of cathode lead tab terminal 13 is also decreased to a distance calculated by subtracting the shift amount (2×S) from distance CPP. As distance CP via central portion C is decreased, a pitch between lead 18c of the anode lead tab terminal and lead 18c of the cathode lead tab terminal is also decreased. In other words, in order to ensure a prescribed pitch, with the use of a one-side pressed terminal, a distance between the connection portions of the anode lead tab terminals can be set longer than in a case of using a both-side pressed terminal.

Consequently, in the electrolytic capacitor in which the connection portion of the anode (cathode) lead tab terminal is located on the outer circumferential surface of the anode (cathode) foil as well, anode lead tab terminal 11, 12 can be connected to anode foil 3 in a stable manner, without plate-shaped connection portions 18b of anode lead tab terminals 11, 12 coming closer to each other, and a desired pitch is obtained without increasing a pitch between leads 18c. Characteristics as the electrolytic capacitor can thus be ensured.

It is noted that leads 18c of first (second) anode lead tab terminals 11, 12 and lead 18c of cathode lead tab terminal 13 are arranged at positions corresponding to respective vertices of a triangle when viewed from a side where lead 18c protrudes. In addition, a case where a one-side pressed terminal is applied as cathode lead tab terminal 13 has been described by way of example of the electrolytic capacitor described above, however, in a case of an electrolytic capacitor having one cathode lead tab terminal, a both-side pressed terminal may be applied as a cathode lead tab terminal.

Example 2

The inventors fabricated as Example 2, electrolytic capacitors in which a one-side pressed terminal was applied as the two anode lead tab terminals and the one cathode lead tab terminal, diameters thereof being set to 5.0 mm, 6.3 mm, 8.0 mm, 10.0 mm, 12.5 mm, and 16.0 mm, respectively, and pitches between the leads being set to 2.0 mm, 2.5 mm, 3.5 mm, 5.0 mm, 5.0 mm, and 7.5 mm, respectively. In addition, an interval between the first anode lead tab terminal and the second anode lead tab terminal was set to a length corresponding to approximately ⅓ of a circumference (an arrangement pattern A) and to a length corresponding to approximately ⅔ of a circumference (an arrangement pattern B) (see FIG. 24). On the other hand, the inventors fabricated as a Comparative Example, electrolytic capacitors having the same size, the same pitch and the same arrangement pattern as above, in which a both-side pressed terminal was applied.

The electrolytic capacitors in Example and Comparative Example were evaluated in terms of an angle θ (see FIG. 19) of one vertex of a triangle formed by connecting to one another, points where leads of three anode (cathode) lead tab terminals are located and distance PL (see FIG. 14) between first anode lead tab terminal 11 and second anode lead tab terminal 12 before winding. Then, a sample of which angle θ was within a range from 20° to 140° and of which distance PL not smaller than 7.0 mm was ensured was determined as a conforming product and a sample in which at least one of angle θ and distance PL did not satisfy the requirement above was determined as a defective product.

Figures 24, 25:
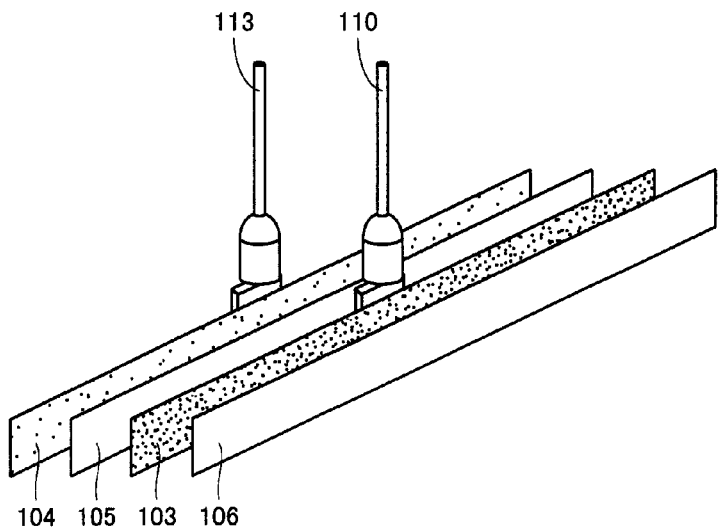
FIG. 24 is a diagram showing results of evaluation of the electrolytic capacitor according to Example 2.
FIG. 25 is a perspective view showing a manner of connection of an anode (a cathode) lead tab terminal to an anode (a cathode) foil and a manner of arrangement of the anode (cathode) foil and a separator in an electrolytic capacitor according to a first conventional technique.

FIG. 24 shows the results. Among the fabricated samples, a sample of which percentage of conforming products was 95% or higher was indicated with a circle and a sample of which percentage of conforming products was lower than 95% was indicated with x. As shown in FIG. 24, attention being paid first to arrangement pattern 13, it can be seen that, in Comparative Example, as the size of the capacitor is smaller, the connection portions of the lead tab terminals come closer to each other and the percentage of conforming products becomes poor. On the other hand, in Example, a distance between the connection portions of the anode (cathode) lead tab terminals can be set longer for the same pitch. Thus, even in a case where a size of a capacitor is small in particular, it can be seen that the anode (cathode) lead tab terminal can be connected to the anode (cathode) foil in a stable manner and the percentage of conforming products can be ensured. Attention being paid next to arrangement pattern A, it can be seen that, in Comparative Example, since the connection portions of the lead tab terminals come further closer to each other, the percentage of conforming products was poor in all electrolytic capacitors (samples 1 to 5) except for the electrolytic capacitor having a largest size (sample 6).

On the other hand, it can be seen that, in Example, since a distance between the connection portions of the anode lead tab terminals can be set longer for the same pitch, desired percentage of conforming products was achieved in the electrolytic capacitors having top three largest sizes (samples 6 to 4). With arrangement pattern A, however, it was found that, since the connection portions of the lead tab terminals come further closer to each other, desired percentage of conforming products was not obtained in the electrolytic capacitors having top three smallest sizes (samples 1 to 3).

Thus, in any case of arrangement pattern A and arrangement pattern B, an electrolytic capacitor adopting one-side pressing was demonstrated to achieve higher percentage of conforming products than an electrolytic capacitor adopting both-side pressing.

Though an electrolytic capacitor including four lead tab terminals and an electrolytic capacitor including three lead tab terminals have been described in the embodiments above by way of example, an electrolytic capacitor in the present invention may include five or more lead tab terminals.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention is effectively utilized in a wound-type electrolytic capacitor obtained by winding up an anode (cathode) foil from one-end side.

What is claimed is:

1. An electrolytic capacitor formed by winding band-shaped anode foil and cathode foil, comprising:
    an anode foil and a cathode foil wound up in a prescribed orientation from one-end side in a longitudinal direction, in a manner opposed to each other;
    a first anode lead tab terminal connected to a portion of said anode foil at a first distance from said one-end side of said anode foil and arranged at a prescribed first position in a circumferential direction in a wound-up state;
    a second anode lead tab terminal connected to a portion of said anode foil at a second distance greater than said first distance from said one-end side of said anode foil and arranged at a prescribed second position in a circumferential direction with respect to said first position in the circumferential direction in the wound-up state;
    a first cathode lead tab terminal connected to a portion of said cathode foil at a third distance from said one-end side of said cathode foil and arranged at a prescribed third position in a circumferential direction with respect to said first position in the circumferential direction and said second position in the circumferential direction in the wound-up state; and
    a second cathode lead tab terminal connected to a portion of said cathode foil at a fourth distance greater than said third distance from said one-end side of said cathode foil and arranged at a prescribed fourth position in a circumferential direction with respect to said third position in the circumferential direction in the wound-up state,
    wherein each of said first anode lead tab terminal and said second anode lead tab terminal includes
    an anode connection portion connected in contact with said anode foil and
    an anode lead electrically connected to said anode connection portion and serving as an anode terminal,
    each of said first cathode lead tab terminal and said second cathode lead tab terminal includes
    a cathode connection portion connected in contact with said cathode foil and
    a cathode lead electrically connected to said cathode connection portion and serving as a cathode terminal,
    said second anode lead tab terminal is connected to a portion of said anode foil corresponding to said second position in the circumferential direction after winding up said anode foil by a prescribed length from the portion of said anode foil corresponding to said first position in the circumferential direction, said first anode lead tab terminal and said second anode lead tab terminal are formed such that a position in a radial direction of said anode lead is arranged on an inner side relative to a position in a radial direction of said anode connection portion in a state that said anode foil is wound up, said second cathode lead tab terminal is connected to a portion of said cathode foil corresponding to said fourth position in the circumferential direction after winding up said cathode foil by a prescribed length from a portion of said cathode foil corresponding to said third position in the circumferential direction, and said first cathode lead tab terminal and said second cathode lead tab terminal are formed such that a position in a radial direction of said cathode lead is arranged on an inner side relative to a position in a radial direction of said cathode connection portion in a state that said cathode foil is wound up.

2. The electrolytic capacitor according to claim 1, wherein a two-dimensional arrangement pattern of said anode lead of said first anode lead tab terminal, said anode lead of said second anode lead tab terminal, said cathode lead of said first cathode lead tab terminal, and said cathode lead of said second cathode lead tab terminal in a state that said anode foil and said cathode foil are wound up is a pattern in which the leads are arranged at vertices of a quadrangle respectively.

3. An electrolytic capacitor formed by winding band-shaped anode foil and cathode foil, comprising:

an anode foil and a cathode foil wound up in a prescribed orientation from one-end side in a longitudinal direction, in a manner opposed to each other;

a first anode lead tab terminal connected to a portion of said anode foil at a first distance from said one-end side of said anode foil and arranged at a prescribed first position in a circumferential direction in a wound-up state;

a second anode lead tab terminal connected to a portion of said anode foil at a second distance greater than said first distance from said one-end side of said anode foil and arranged at a prescribed second position in a circumferential direction with respect to said first position in the circumferential direction in the wound-up state; and one cathode lead tab terminal connected to a portion of said cathode foil at a third distance from said one-end side of said cathode foil and arranged at a prescribed third position in a circumferential direction with respect to said first position in the circumferential direction and said second position in the circumferential direction in the wound-up state, wherein each of said first anode lead tab terminal and said second anode lead tab terminal includes an anode connection portion connected in contact with said anode foil and an anode lead electrically connected to said anode connection portion and serving as an anode terminal, said cathode lead tab terminal includes a cathode connection portion connected in contact with said cathode foil and a cathode lead electrically connected to said cathode connection portion and serving as a cathode terminal, said second anode lead tab terminal is connected to a portion of said anode foil corresponding to said second position in the circumferential direction after winding up said anode foil by a prescribed length from the portion of said anode foil corresponding to said first position in the circumferential direction, said first anode lead tab terminal and said second anode lead tab terminal are formed such that a position in a radial direction of said anode lead is arranged on an inner side relative to a position in a radial direction of said anode connection portion in a state that said anode foil is wound up, and said cathode lead tab terminal is formed such that a position in a radial direction of said cathode lead is arranged on an inner side relative to a position in a radial direction of said cathode connection portion in a state that said cathode foil is wound up.

4. The electrolytic capacitor according to claim 3, wherein a two-dimensional arrangement pattern of said anode lead of said first anode lead tab terminal, said anode lead of said second anode lead tab terminal, and said cathode lead of said cathode lead tab terminal in a state that said anode foil and said cathode foil are wound up is a pattern in which the leads are arranged at vertices of a triangle respectively.

* * * * *